US009940153B2

(12) United States Patent
Yin et al.

(10) Patent No.: US 9,940,153 B2
(45) Date of Patent: Apr. 10, 2018

(54) METHOD FOR GENERATING CONFIGURATION INFORMATION, AND NETWORK CONTROL UNIT

(71) Applicant: Huawei Technologies Co., Ltd., Shenzhen, Guangdong (CN)

(72) Inventors: Yue Yin, Nanjing (CN); Feng Li, Nanjing (CN); Shifang Dai, Shenzhen (CN); Hong Zhou, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 213 days.

(21) Appl. No.: 14/828,118

(22) Filed: Aug. 17, 2015

(65) Prior Publication Data

US 2015/0355934 A1 Dec. 10, 2015

Related U.S. Application Data

(63) Continuation of application No. PCT/CN2014/072090, filed on Feb. 14, 2014.

(30) Foreign Application Priority Data

Feb. 18, 2013 (CN) .......................... 2013 1 0052713

(51) Int. Cl.
  *G06F 9/455* (2006.01)
  *H04L 12/931* (2013.01)
  *H04L 12/24* (2006.01)
(52) U.S. Cl.
  CPC .......... *G06F 9/45558* (2013.01); *H04L 41/08* (2013.01); *H04L 49/70* (2013.01); *G06F 2009/45595* (2013.01)
(58) Field of Classification Search
  None
  See application file for complete search history.

(56) References Cited

U.S. PATENT DOCUMENTS

| 7,484,208 | B1 | 1/2009 | Nelson | |
|---|---|---|---|---|
| 2010/0131636 | A1* | 5/2010 | Suri | ........................ H04L 45/00 709/224 |
| 2011/0035494 | A1* | 2/2011 | Pandey | ................. G06F 9/5077 709/224 |
| 2011/0205904 | A1 | 8/2011 | Nakagawa | |

(Continued)

FOREIGN PATENT DOCUMENTS

| CN | 102136931 A | 7/2011 |
|---|---|---|
| CN | 102185774 A | 9/2011 |

(Continued)

OTHER PUBLICATIONS

"WT-302 Framework for Cloud Services in Broadband Networks", Jan. 2013, Broadband forum, 59 pages.

(Continued)

*Primary Examiner* — Tammy Lee

(57) ABSTRACT

A method for generating configuration information includes: a network control unit receives a virtual machine association message, where the VM association message includes an identifier of a first VM and an identifier of a first virtual built-in network element (NE), where a state of the first VM changes and the first virtual built-in NE detects that the state of the first VM changes; and the network control unit determines first information according to the identifier of the first VM, where the first information includes at least one of: a first forwarding entry, a location information mapping entry of the first VM, and a first network policy. According to the method, a network control unit determines first information according to an identifier of a first VM whose state changes and whose identifier is included in a VM association message, network configuration efficiency and network performance are improved.

16 Claims, 8 Drawing Sheets

(56) References Cited

U.S. PATENT DOCUMENTS

| | | |
|---|---|---|
| 2011/0246669 A1 | 10/2011 | Kanada et al. |
| 2012/0072909 A1* | 3/2012 | Malik ................ H04L 12/4641 718/1 |
| 2012/0198441 A1* | 8/2012 | Mandavi ................ G06F 9/455 718/1 |
| 2013/0031235 A1 | 1/2013 | Yin et al. |
| 2014/0007100 A1 | 1/2014 | Gu et al. |
| 2014/0192804 A1* | 7/2014 | Ghanwani ............... H04L 49/70 370/390 |

FOREIGN PATENT DOCUMENTS

| | | |
|---|---|---|
| CN | 102209024 A | 10/2011 |
| CN | 102413041 A | 4/2012 |
| CN | 102694672 A | 9/2012 |
| CN | 102724080 A | 10/2012 |

OTHER PUBLICATIONS

"Media Access Control (MAC) Bridges and Virtual Bridged Local Area Networks—Amendment 20: Shortest Path Bridging", IEEE Computer Society, IEEE Standards Assocaition, Jun. 29, 2012, 340 pages.

R. Schott, et at., "Network Management automation for VM", Network Virtualization Overlays Working Group, Oct. 12, 2012, 18 pages.

L. Jin, et al., "Virtualized Integrated Routing & Bridging with centralized control plane", Network Working Group, Dec. 13, 2012, 10 pages.

L. Yong, et al., "NVO3 Framework and Data Plane Requirement Addition", Network Working Group, Dec. 11, 2012, 9 pages.

"OpenFlow Switch Specification, Version 1.2 (Wire Protocol 0x03)", Open Networking Foundation, Dec. 5, 2011, 85 pages.

R. Braden, Ed., et al., "Resource ReSerVation Protocol (RSVP)—Version 1 Functional Specification", Network Working Group, Sep. 1997, 112 pages.

D. Harrington, et al., "An Architecture for Describing Simple Network Management Protocol (SNMP) Management Frameworks", Network Working Group, Dec. 2002, 64 pages.

R. Perlman, et al., "Routing Bridges (RBridges): Base Protocol Specification", Internet Engineering Task Force (IETF), Jul. 2011, 99 pages.

\* cited by examiner

METHOD FOR GENERATING CONFIGURATION INFORMATION, AND NETWORK CONTROL UNIT

CROSS-REFERENCE TO RELATED APPLICATIONS

This application is a continuation of International Application No. PCT/CN2014/072090, filed on Feb. 14, 2014, which claims priority to Chinese Patent Application No. 201310052713.8, filed on Feb. 18, 2013, both of which are hereby incorporated by reference in their entireties.

TECHNICAL FIELD

The present application relates to the field of communications, and in particular, to a method for generating configuration information, and a network control unit.

BACKGROUND

A virtual machine (VM) refers to a complete computer system that is simulated by using software, has a function of a complete hardware system, and is run in a completely isolated environment. Generally, one or more virtual machines can be simulated on one physical computer, and these virtual machines can work like real computers.

With increasing demands for improving server utilization and reducing a server cost, a server virtualization technology emerges based on a virtual machine technology. Server virtualization refers to abstracting a physical resource of a server into a logical resource, changing one server into several or even hundreds of virtual servers that are isolated from each other, or changing several servers into one server for use, so that restrictions of physical boundaries are overcome, and hardware such as a central processing unit (CPU), memory, a magnetic disk, or an input/output (I/O) changes into a "resource pool" that can be dynamically managed, thereby greatly improving resource utilization and simplifying system management. In a data center (DC) network, after a server is virtualized, traffic of multiple or even dozens of VMs may exist on a same physical port of a switch. For different VMs, corresponding information, for example, a network policy and a forwarding table, needs to be configured. Currently, the configuration of all of the corresponding information is implemented by means of manual configuration. When a state of a virtual machine changes, for example, when a server performs an operation, such as creation or deletion, on the virtual machine, the related configuration information also changes. However, a manual configuration method causes both a heavy workload and poor timeliness, which severely affect network performance.

SUMMARY

Embodiments of the present application provide a method for generating configuration information, and a network control unit, which can improve network configuration efficiency and improve network performance.

According to a first aspect, a method for generating configuration information is provided and includes: receiving, by a network control unit, a virtual machine association message, where the virtual machine association message includes an identifier of a first virtual machine and an identifier of a first virtual built-in network element, where a state of the first virtual machine changes and the first virtual built-in network element detects that the state of the first virtual machine changes; and determining, by the network control unit, first information according to the identifier of the first virtual machine, where the first information includes at least one of the following information: a first forwarding entry, a location information mapping entry of the first virtual machine, and a first network policy.

With reference to the first aspect, in a first possible implementation manner, when the first information includes the first forwarding entry, the determining, by the network control unit, first information according to the identifier of the first virtual machine includes: determining an address of the first virtual machine according to the identifier of the first virtual machine; determining, according to the identifier of the first virtual built-in network element, an identifier of a first network element, and a network topology of a network including the first virtual built-in network element and the first network element, a first outbound port that is on the first network element and leads to the first virtual built-in network element; and generating the first forwarding entry for the first network element according to the address of the first virtual machine and the first outbound port, where a destination address of the first forwarding entry includes the address of the first virtual machine, and an outbound port of the first forwarding entry includes the first outbound port, where the address of the first virtual machine includes one or more of an Internet Protocol (IP) address and a Media Access Control (MAC) address.

With reference to the first possible implementation manner of the first aspect, in a second possible implementation manner, the determining an address of the first virtual machine according to the identifier of the first virtual machine includes one of:

when the identifier of the first virtual machine is the address of the first virtual machine, determining that the identifier of the first virtual machine as the address of the first virtual machine;

and, searching for a correspondence between the identifier of the first virtual machine and the address of the first virtual machine according to the identifier of the first virtual machine, and determining the address of the first virtual machine.

With reference to the first possible implementation manner of the first aspect or the second possible implementation manner of the first aspect, in a third possible implementation manner, the first network element is one of:

a network element on a path between a second virtual machine and the first virtual machine;

a network element on a path between a network virtualization environment (NVE) node, the number of hops from which to the first virtual built-in network element is the smallest, and the first virtual machine;

an NVE node, the number of hops from which to the first virtual built-in network element is the smallest;

any NVE node in a virtual network to which the first virtual machine belongs;

and any network element in a network.

With reference to the first aspect, the first possible implementation manner of the first aspect, the second possible implementation manner of the first aspect, or the third possible implementation manner of the first aspect, in a fourth possible implementation manner, when the first information includes the location information mapping entry of the first virtual machine, the determining, by the network control unit, first information according to the identifier of the first virtual machine includes: determining, according to a network topology of a network including the first virtual built-in network element and at least one NVE node, and the identifier of the first virtual built-in network element, the NVE node, the number of hops from which to the first virtual built-in network element is the smallest; determining an identifier of a first virtual network including the first virtual machine and the first virtual built-in network element; and generating the location information mapping entry of the first virtual machine, where the location information mapping entry of the first virtual machine includes the identifier of the first virtual machine, an identifier of the NVE node, the number of hops from which to the first virtual built-in network element is the smallest, and the identifier of the first virtual network.

With reference to the fourth possible implementation manner of the first aspect, in a fifth possible implementation manner, the determining an identifier of a first virtual network including the first virtual machine and the first virtual built-in network element includes one of:

when the virtual machine association message carries the identifier of the first virtual network, determining the identifier of the first virtual network according to the virtual machine association message;
and
determining, according to the identifier of the first virtual machine, a first policy corresponding to the identifier of the first virtual machine, and determining the identifier of the first virtual network according to the first policy, where the first policy includes the identifier of the first virtual network.

With reference to the first aspect or any implementation manner of the first possible implementation manner of the first aspect to the fifth possible implementation manner of the first aspect, in a sixth possible implementation manner, when the first information includes the first network policy, the determining, by the network control unit, first information according to the identifier of the first virtual machine includes: searching a correspondence table and a network policy table according to the identifier of the first virtual machine, and determining a network policy corresponding to the first virtual machine, where the correspondence table is used to indicate a correspondence between an identifier of a virtual machine and an identifier of a network policy, and the network policy table includes at least one group of network policies and an identifier of each group of network policies; and determining the first network policy, where the first network policy includes the network policy corresponding to the first virtual machine.

With reference to the sixth possible implementation manner of the first aspect, in a seventh possible implementation manner, the method further includes: sending the first network policy to a network service device, where the network service device is configured to process services. where the services are at the fourth layer to the seventh layer of the Open System Interconnection (OSI) model and are in an area in which the first virtual built-in network element is located, and the network service device is determined according to the identifier of the first virtual built-in network element and a network topology of a network including the first virtual built-in network element.

With reference to the first aspect or any implementation manner of the first possible implementation manner of the first aspect to the seventh possible implementation manner of the first aspect, in an eighth possible implementation manner, the first virtual machine whose state changes is one of: a created virtual machine, a deleted virtual machine, a virtual machine migrating to the first virtual built-in network element, and a virtual machine whose attribute changes.

With reference to the first aspect or any implementation manner of the first possible implementation manner of the first aspect to the eighth possible implementation manner of the first aspect, in a ninth possible implementation manner, the first virtual built-in network element is a network access device of the first virtual machine.

With reference to the first aspect or any implementation manner of the first possible implementation manner of the first aspect to the ninth possible implementation manner of the first aspect, in a tenth possible implementation manner, the receiving, by a network control unit, a virtual machine association message includes one of:

receiving, by the network control unit, the virtual machine association message from the first virtual built-in network element;
and,
receiving, by the network control unit, the virtual machine association message from an access switch, where the virtual machine association message is received by the access switch from the first virtual built-in network element.

According to a second aspect, a network control unit is provided and includes: a receiving module, configured to receive a virtual machine association message, where the virtual machine association message includes an identifier of a first virtual machine and an identifier of a first virtual built-in network element, where a state of the first virtual machine changes and the first virtual built-in network element detects that the state of the first virtual machine changes; and a determining module, configured to determine first information according to the identifier of the first virtual machine, where the first information includes at least one of the following information: a first forwarding entry, a location information mapping entry of the first virtual machine, and a first network policy.

With reference to the second aspect, in a first possible implementation manner, when the first information includes the first forwarding entry, the determining module is specifically configured to determine an address of the first virtual machine according to the identifier of the first virtual machine; determine, according to the identifier of the first virtual built-in network element, an identifier of a first network element, and a network topology of a network including the first virtual built-in network element and the first network element, a first outbound port, where the first outbound port is on the first network element and leads to the first virtual built-in network element; and generate the first forwarding entry for the first network element according to the address of the first virtual machine and the first outbound port, where a destination address of the first forwarding entry includes the address of the first virtual machine, and an outbound port of the first forwarding entry includes the first outbound port, where the address of the first virtual machine includes one or more of an Internet Protocol (IP) address and a Media Access Control (MAC) address.

With reference to the first possible implementation manner of the second aspect, in a second possible implementation manner, the determining module is specifically configured to perform one of:

when the identifier of the first virtual machine is the address of the first virtual machine, determine the identifier of the first virtual machine as the address of the first virtual machine;
and,
search for a correspondence between the identifier of the first virtual machine and the address of the first virtual machine according to the identifier of the first virtual machine, and determine the address of the first virtual machine.

With reference to the first possible implementation manner of the second aspect or the second possible implementation manner of the second aspect, in a third possible implementation manner, the first network element is a network element on a path between a second virtual machine and the first virtual machine;

a network element on a path between a network virtualization environment (NVE) node, the number of hops from which to the first virtual built-in network element is the smallest, and the first virtual machine;

an NVE node, the number of hops from which to the first virtual built-in network element is the smallest;

any NVE node in a virtual network to which the first virtual machine belongs;

and any network element in a network.

With reference to the second aspect or any implementation manner of the first possible implementation manner of the second aspect to the third possible implementation manner of the second aspect, in a fourth possible implementation manner, when the first information includes the location information mapping entry of the first virtual machine, the determining module is specifically configured to: determine, according to a network topology of a network including the first virtual built-in network element and at least one NVE node, and the identifier of the first virtual built-in network element, the NVE node, the number of hops from which to the first virtual built-in network element is the smallest; determine an identifier of a first virtual network including the first virtual machine and the first virtual built-in network element; and generate the location information mapping entry of the first virtual machine, where the location information mapping entry of the first virtual machine includes the identifier of the first virtual machine, an identifier of the NVE node, the number of hops from which to the first virtual built-in network element is the smallest, and the identifier of the first virtual network.

With reference to the fourth possible implementation manner of the second aspect, in a fifth possible implementation manner, the determining module is specifically configured to perform one of:

when the virtual machine association message carries the identifier of the first virtual network, determine the identifier of the first virtual network according to the virtual machine association message;

and, determine, according to the identifier of the first virtual machine, a first policy corresponding to the identifier of the first virtual machine, and determine the identifier of the first virtual network according to the first policy, where the first policy includes the identifier of the first virtual network.

With reference to the second aspect or any implementation manner of the first possible implementation manner of the second aspect to the fifth possible implementation manner of the second aspect, in a sixth possible implementation manner, when the first information includes the first network policy, the determining module is specifically configured to: search a correspondence table and a network policy table according to the identifier of the first virtual machine, and determine a network policy corresponding to the first virtual machine, where the correspondence table is used to indicate a correspondence between an identifier of a virtual machine and an identifier of a network policy, and the network policy table includes at least one group of network policies and an identifier of each group of network policies; and determine the first network policy, where the first network policy includes the network policy corresponding to the first virtual machine.

With reference to the sixth possible implementation manner of the second aspect, in a seventh possible implementation manner, the network control unit further includes: a sending module, configured to send the first network policy to a network service device, where the network service device is configured to process services where the services are at the fourth layer to the seventh layer of the Open System Interconnection (OSI) model and are in an area in which the first virtual built-in network element is located, and the network service device is determined according to the identifier of the first virtual built-in network element and a network topology of a network including the first virtual built-in network element.

With reference to the second aspect or any implementation manner of the first possible implementation manner of the second aspect to the seventh possible implementation manner of the second aspect, in an eighth possible implementation manner, the first virtual machine whose state changes is one of: a created virtual machine, a deleted virtual machine, a virtual machine migrating to the first virtual built-in network element, and a virtual machine whose attribute changes.

With reference to the second aspect or any implementation manner of the first possible implementation manner of the second aspect to the eighth possible implementation manner of the second aspect, in a ninth possible implementation manner, the first virtual built-in network element is a network access device of the first virtual machine.

With reference to the second aspect or any implementation manner of the first possible implementation manner of the second aspect to the ninth possible implementation manner of the second aspect, in a tenth possible implementation manner, the receiving module is specifically configured to perform one of:

receive the virtual machine association message from the first virtual built-in network element;

and, receive the virtual machine association message from an access switch, where the virtual machine association message is received by the access switch from the first virtual built-in network element.

In the embodiments of the present application, a network control unit determines first information according to an identifier of a first virtual machine, where a state of the first virtual machine changes and the identifier of the first virtual machine is included in a virtual machine association message, without the need of manual determining, thereby network configuration efficiency and network performance are improved.

BRIEF DESCRIPTION OF DRAWINGS

To describe the technical solutions in the embodiments of the present application more clearly, the following briefly introduces the accompanying drawings required for describing the embodiments of the present application. Apparently, the accompanying drawings in the following description show merely some embodiments of the present application, and a person of ordinary skill in the art may still derive other drawings from these accompanying drawings without creative efforts.

DETAILED DESCRIPTION

The following clearly describes the technical solutions in the embodiments of the present application with reference to the accompanying drawings in the embodiments of the present application. Apparently, the described embodiments are a part rather than all of the embodiments of the present application. All other embodiments obtained by a person of ordinary skill in the art based on the embodiments of the present application without creative efforts shall fall within the protection scope of the present application.

Figures 1, 2:
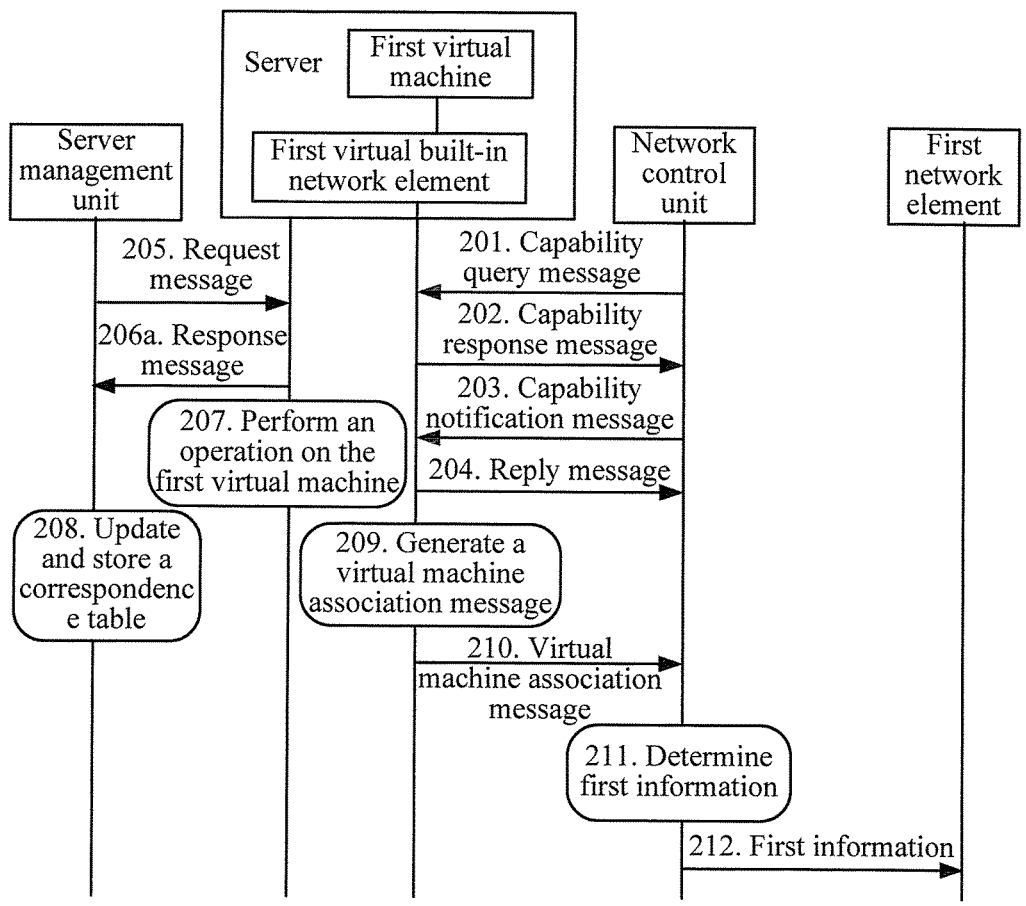
FIG. 1 shows a method for generating configuration information according to an embodiment of the present application.
FIG. 2 is a schematic flowchart of a process of a method for generating configuration information according to an embodiment of the present application.

FIG. 1 shows a method for generating configuration information according to an embodiment of the present application.

110: A network control unit receives a virtual machine association message, where the virtual machine association message includes an identifier of a first virtual machine and an identifier of a first virtual built-in network element, where a state of the first virtual machine changes and the first virtual built-in network element detects that the state of the first virtual machine changes.

The first virtual built-in network element may refer to a virtual network device located in a server. Optionally, the first virtual built-in network element is a network access device of the first virtual machine, for example, the first virtual built-in network element may be a virtual switch, a virtual router, or a network virtualization edge node.

In the server, the first virtual machine may directly or indirectly connect with a specific virtual port of the first virtual built-in network element. When the state of the first virtual machine changes, the first virtual built-in network element can detect that the state of the virtual machine changes, and generate the virtual machine association message. Generally, one virtual built-in network element may connect with one or more virtual machines, and when the first virtual built-in network element can detect that the state of the first virtual machine changes, it may be considered that the first virtual built-in network element is a virtual built-in network element corresponding to the first virtual machine, and it may also be considered that the first virtual machine is a virtual machine on the first virtual built-in network element.

Optionally, as an embodiment, the first virtual machine whose state changes may include a created virtual machine, a deleted virtual machine, a virtual machine migrating to the first virtual built-in network element, and a virtual machine whose attribute changes. For example, when the server performs an operation on the first virtual machine, the state of the first virtual machine changes. For example, the server may perform an operation, such as creation, deletion, migration, or attribute changing, on the first virtual machine.

120: The network control unit determines first information according to the identifier of the first virtual machine, where the first information includes at least one of the following information: a first forwarding entry, a location information mapping entry of the first virtual machine, and a first network policy.

That the first information includes at least one of the following information: a first forwarding entry, a location information mapping entry of the first virtual machine, and a first network policy indicates that: the first information includes the first forwarding entry, the location information mapping entry of the first virtual machine, or the first network policy; or, the first information includes the first forwarding entry and the location information mapping entry of the first virtual machine; or, the first information includes the first forwarding entry and the first network policy; or, the first information includes the location information mapping entry of the first virtual machine and the first network policy; or, the first information includes the first forwarding entry, the location information mapping entry of the first virtual machine, and the first network policy.

Generally, when a state of a virtual machine changes, some configuration information related to the virtual machine also changes, for example, related content in a forwarding table, a virtual machine location information mapping table, or a network policy changes. In the prior art, generally, the information needs to be manually configured. However, in the embodiment of the present application, when the state of the first virtual machine changes, the network control unit may determine the first information according to the identifier of the first virtual machine carried in the virtual machine association message. Herein, the first information may include at least one of the following: the first forwarding entry, the location information mapping entry of the first virtual machine, and the first network policy, and the related configuration information does not need to be manually determined, so that not only configuration efficiency can be improved, but also a related network element can obtain the configuration information in real time during a subsequent process, thereby improving network performance.

For example, the first forwarding entry may be an entry in a Layer 2 forwarding table or an entry in a Layer 3 forwarding table.

The first network policy may include at least one of the following: a virtual local area network (VLAN) configuration, a bandwidth limitation configuration, a quality of service (QoS) configuration, a firewall configuration, a port isolation configuration, Dynamic Host Configuration Protocol snooping (DHCP Snooping), load balancing, a virtual network identifier (VNID) configuration, and the like.

In the embodiment of the present application, a network control unit determines first information according to an identifier of a first virtual machine, where a state of the first virtual machine changes, and the identifier of the first virtual machine is included in a virtual machine association message, without the need of manual determining, thereby network configuration efficiency and network performance are improved.

Optionally, as another embodiment, in step 120, when the first information includes the first forwarding entry, the network control unit may determine an address of the first virtual machine according to the identifier of the first virtual machine; determine, according to the identifier of the first virtual built-in network element, an identifier of a first network element, and a network topology of a network including the first virtual built-in network element and the first network element, a first outbound port, where the first outbound port is on the first network element and leads to the first virtual built-in network element; and generate the first forwarding entry for the first network element according to the address of the first virtual machine and the first outbound port, where a destination address of the first forwarding entry may include the address of the first virtual machine, and an outbound port of the first forwarding entry may include the first outbound port, where the address of the first virtual machine may include one or more of an Internet Protocol (IP) address and a Media Access Control (MAC) address.

The network topology may include a physical network topology outside the server and a network topology in the server, for example, the network topology may include a physical network element, a virtual network element, and path information. The network control unit may determine the foregoing network topology in multiple manners. For example, the network control unit may obtain information about each network element in the network including the first virtual built-in network element and the first network element, for example, the network control unit may obtain the information about each network element from each network element by using a protocol such as the OpenFlow, the Extensible Messaging and Presence Protocol (XMPP), the Simple Network Management Protocol (SNMP), the Resource Reservation Protocol (Resource Reservation Protocol, RSVP), or the Network Configuration Protocol (Netconf), or a proprietary protocol. Then, the network control unit may determine the foregoing network topology according to the information about each network element. It should be noted that, if the network control unit cannot directly communicate with the first virtual built-in network element, the first virtual built-in network element may send information about the network topology in the server to an access switch, and the access switch sends the information to the network control unit. The first virtual built-in network element may send the information about the network topology in the server to the access switch by using a protocol such as the Virtual Station Interface Discovery and Configuration Protocol (VDP), or the Link Layer Discovery Protocol (LLDP), or a proprietary protocol.

Alternatively, the network control unit may obtain the foregoing network topology from a network management unit. In addition, the network control unit may determine a network resource list, where the network resource list may include a topology corresponding to the first virtual built-in network element. For example, the network resource list may include the following content: the identifier of the first virtual built-in network element, an identifier of an associated network element, an identifier of an associated path, an associated topology, and the like. The associated topology may include the topology corresponding to the first virtual built-in network element. The network resource list may be stored in a database.

Optionally, as another embodiment, the network control unit may search for a correspondence between the identifier of the first virtual machine and the address of the first virtual machine according to the identifier of the first virtual machine, and determine the address of the first virtual machine.

For example, the identifier of the first virtual machine may be a serial number of the first virtual machine in a network, and the network control unit may determine the address of the first virtual machine according to a correspondence between the serial number and the address of the first virtual machine.

In addition, when the identifier of the first virtual machine is the address of the first virtual machine, the network control unit may further determine the identifier of the first virtual machine as the address of the first virtual machine.

Optionally, as another embodiment, the first network element may be a network element on a path between a second virtual machine and the first virtual machine; or, the first network element may be a network element on a path between a network virtualization environment (NVE) node and the first virtual machine, where the number of hops from the NVE node to the first virtual built-in network element is the smallest; or the first network element may be an NVE node, the number of hops from which to the first virtual built-in network element is the smallest; or the first network element may be any network element in a network including the first virtual built-in network element; or, the first network element may be any NVE node in a virtual network to which the first virtual machine belongs.

The first network element may be a network element on the path between the second virtual machine and the first virtual machine. Herein, the second virtual machine is a virtual machine that can communicate with the first virtual machine. For example, a virtual machine 1 and a virtual machine 2 can communicate with the first virtual machine, so that the first network element can include a network element on a path from the first virtual machine to the virtual machine 1 or a network element on a path from the first virtual machine to the virtual machine 2.

The first network element may also be a network element on the path between the NVE node, the number of hops from which to the first virtual built-in network element is the smallest, and the first virtual machine. Alternatively, the first network element may be the NVE node, the number of hops from which to the first virtual built-in network element is the smallest, or the first network element may be any NVE node that belongs to a same virtual network as the first virtual machine.

Generally, one physical network may include multiple virtual networks, and each virtual network has a unique identifier, that is, a virtual network identifier (VNID). A virtual network may include multiple network elements, such as NVE nodes. An NVE node is a network element configured for Layer 3 tunnel encapsulation and decapsulation. NVE nodes may be directly connected, or may be connected by using other intermediate network elements. The intermediate network elements between the NVE nodes are only configured for simple forwarding and not for decapsulation.

Each virtual machine may be mapped to one NVE node, and multiple virtual machines may be mapped to a same NVE node. An NVE node to which a virtual machine is mapped may be an NVE node, the number of hops from which to the virtual machine is the smallest. The NVE node, the number of hops from which to the virtual machine is the smallest, is an NVE node, the number of hops from which to a virtual built-in network element corresponding to the virtual machine is the smallest. For example, the NVE node, the number of hops from which to the first virtual machine is the smallest, is an NVE node, the number of hops from which to the first virtual built-in network element is the smallest. Generally, a virtual network to which a virtual machine belongs determines a virtual network to which an NVE node belongs, that is, a VNID of a network in which the virtual machine is located determines a VNID of a network in which an NVE node to which the virtual machine is mapped is located. A virtual machine and an NVE node, the number of hops from which to the virtual machine is the smallest, generally belong to a same virtual network, that is, they have a same VNID.

A virtual machine and an NVE node, the number of hops from which to the virtual machine is the smallest, may be directly connected in a same server, or may be connected by using another virtual network element or physical network element. For example, a virtual machine and an NVE node, the number of hops from which to the virtual machine is the smallest, may be connected by using a virtual switch or an access switch.

It can be seen from the foregoing description that, a communication relationship exists between a virtual machine and an NVE node. Therefore, when the state of the first virtual machine changes, the first network element may be a network element on the path between the NVE node, the number of hops from which to the first virtual built-in network element is the smallest, and the first virtual machine; or, the first network element may be the NVE node, the number of hops from which to the first virtual built-in network element is the smallest; or, the first network element may be any NVE node that belongs to a same virtual network as the first virtual machine.

It should be understood that, the first network element may be a virtual network element or a physical network element, for example, the first network element may be an access switch, an aggregation switch, a core switch, a gateway, an NVE node, a virtual built-in network element, or an egress router. Herein, the first network element includes neither a physical host nor a virtual host.

Optionally, as another embodiment, in step 120, when the first information includes the location information mapping entry of the first virtual machine, the network control unit may determine, according to a network topology of a network including the first virtual built-in network element and at least one NVE node, and the identifier of the first virtual built-in network element, the NVE node, the number of hops from which to the first virtual built-in network element is the smallest; determine an identifier of a first virtual network including the first virtual machine and the first virtual built-in network element; and generate the location information mapping entry of the first virtual machine, where the location information mapping entry of the first virtual machine includes the identifier of the first virtual machine, an identifier of the NVE node, the number of hops from which to the first virtual built-in network element is the smallest, and the identifier of the first virtual network.

The identifier of the first virtual machine can uniquely identify the first virtual machine. For example, the identifier of the first virtual machine may be the serial number of the first virtual machine, the IP address of the first virtual machine, or the MAC address of the first virtual machine, or may be a combination of the IP address and the MAC address of the first virtual machine, or the like. The identifier of the NVE node, the number of hops from which to the first virtual built-in network element is the smallest, can uniquely identify one NVE node, for example, the identifier of the NVE node, the number of hops from which to the first virtual built-in network element is the smallest, may be an IP address of the NVE node. The identifier of the first virtual network may be a network serial number of the first virtual network.

Optionally, as another embodiment, in step 120, when the virtual machine association message carries the identifier of the first virtual network, the network control unit may determine the identifier of the first virtual network according to the virtual machine association message. Alternatively, the network control unit may determine, according to the identifier of the first virtual machine, a first policy corresponding to the identifier of the first virtual machine, and may determine the identifier of the first virtual network according to the first policy. The first policy may include the identifier of the first virtual network.

For example, a correspondence between the identifier of the first virtual machine and a policy may be stored in a database. The network control unit may obtain the correspondence from the database, so that the network control unit may search, according to the correspondence between the identifier of the first virtual machine and a policy, for the first policy corresponding to the identifier of the first virtual machine, where the first policy may include the identifier of the first virtual network to which the first virtual machine belongs. The first policy may further include other related information of the first virtual machine.

After the network control unit determines the location information mapping entry of the first virtual machine, the network control unit may send, to NVE nodes in the virtual network to which the first virtual machine belongs, a virtual machine location information mapping table including the location information mapping entry of the first virtual machine, so that these related NVE nodes obtain an updated virtual machine location information mapping table in time, thereby improving the network performance.

Optionally, as another embodiment, in step 120, when the first information includes the first network policy, the network control unit may search a correspondence table and a network policy table according to the identifier of the first virtual machine, and determine a network policy corresponding to the first virtual machine, where the correspondence table is used to indicate a correspondence between an identifier of a virtual machine and an identifier of a network policy, and the network policy table may include at least one group of network policies and an identifier of each group of network policies. The network control unit may determine the first network policy, where the first network policy includes the network policy corresponding to the first virtual machine.

For example, an initial correspondence table may be determined at a network initialization stage, for example, may be independently determined by a server management unit, may be determined by means of negotiation between a server management unit and the network control unit, or may be determined by a third party. The correspondence table may be stored in a database. When the change of the state of the first virtual machine causes a change of the network policy, a server management unit may update the correspondence table, and then store the correspondence table in a database. For example, the server management unit may send a request message to a server, where the request message may be used to request the server to perform an operation on the first virtual machine. The server may determine, according to a resource of the server or a state of a VM, whether the server can perform the operation. If the server can perform the operation, the server may send a response message to the server management unit, where the response message may include indication information and the identifier of the first virtual machine, where the indication information may indicate that the operation can be performed on the first virtual machine, and the like. In this way, the server management unit may update the correspondence table according to the identifier of the first virtual machine and the indication information.

For example, if the indication information indicates that a non-deletion operation can be performed on a virtual machine, the server management unit may obtain network policy group information from the database, and the server management unit may change, based on the network policy group information, the identifier of the network policy, where the identifier of the network policy is in a policy mapping table and is corresponding to the identifier of the first virtual machine. That is, the network policy corresponding to the virtual machine is adjusted. For example, if the indication information indicates that a deletion operation can be performed on a virtual machine, the server management unit may delete an entry that is in the correspondence table and includes the identifier of the virtual machine.

The network control unit may search the correspondence table in the database according to the identifier of the first virtual machine, to determine the identifier of the network policy corresponding to the identifier of the first virtual machine, and then search the network policy table according to the identifier of the network policy, to determine the network policy corresponding to the first virtual machine, thereby determining the first network policy.

The network policy table may include at least one group of network policies and the identifier of each group of network policies. Each group of network policies may include entries such as a VLAN configuration, a VNID configuration, a bandwidth limitation configuration, and/or a port isolation configuration. The network policy table may be determined by the network control unit; alternatively the network policy table may be determined by means of negotiation between the network control unit and the server management unit; alternatively the network policy table may be determined by a third party. For example, the network policy group information may be determined at the network initialization stage and stored in the database.

The foregoing database may be located in another node independent of the network control unit, or may be located in the network control unit. If the database is located in another node independent of the network control unit, the network control unit may query the database by using a network interface.

Optionally, as another embodiment, after step 120, the network control unit may send the first network policy to a network service device (Network Service Appliance), where the network service device is configured to process services, where the services are at the fourth layer to the seventh layer of the Open System Interconnection (OSI) model and are in an area in which the first virtual built-in network element is located, and the network service device may be determined according to the identifier of the first virtual built-in network element and a network topology of a network including the first virtual built-in network element.

Network policies of the fourth layer to the seventh layer, such as a firewall, load balancing, or network address translation (NAT), may be implemented by a dedicated device in a network, for example, may be implemented by the foregoing network service device. For example, the network service device may include a firewall device, a load balancer, an NAT device, or the like. Therefore, after determining the first network policy, the network control unit may send the first network policy to the network service device.

In addition, the network control unit may further send the first network policy to one or more network elements on an end-to-end path on which the first virtual built-in network element is located. For example, when the first virtual machine is created or deleted, or an attribute of the first virtual machine changes, the network control unit may send a first network policy to a network element on a path from the first virtual built-in network element to an egress router. When a migration operation is performed on the first virtual machine, the network control unit may send the first network policy to a network element on a path from a source server to a destination server. The source server may refer to a server from which the first virtual machine migrates, and the destination server may refer to a server to which the first virtual machine migrates.

In this way, the network control unit sends the first network policy, so that a related network element can obtain an updated network policy in time, thereby improving the network performance.

Optionally, as another embodiment, in step 110, if the network control unit can directly communicate with the first virtual built-in network element, the network control unit receives the virtual machine association message from the first virtual built-in network element.

The network control unit may centrally control virtual built-in network elements in the server, so that the network control unit may directly receive the virtual machine association message from the first virtual built-in network element.

Optionally, as another embodiment, in step 110, if the network control unit cannot directly communicate with the first virtual built-in network element, the network control unit may receive the virtual machine association message from an access switch, where the virtual machine association message is received by the access switch from the first virtual built-in network element.

If the network control unit does not centrally control the virtual built-in network elements in the server, the network control unit cannot directly receive the virtual machine association message from the first virtual built-in network element. The first virtual built-in network element may send the virtual machine association message to the access switch, and then the access switch sends the virtual machine association message to the network control unit. An interaction protocol between the first virtual built-in network element and the access switch may be different from an interaction protocol between the access switch and the network control unit. Therefore, after receiving the virtual machine association message, the access switch may perform corresponding processing on the virtual machine association message based on the interaction protocol between the access switch and the network control unit, and send the processed virtual machine association message to the network control unit.

Optionally, as another embodiment, the virtual machine association message may further include a state change type of the first virtual machine. For example, the state change type may include creation, deletion, migration, attribute changing, or other change types.

The following describes the embodiments of the present application in detail with reference to specific examples. It should be noted that, these examples are merely intended to help a person skilled in the art to better understand the embodiments of the present application rather than to limit the scope of the embodiments of the present application.

FIG. 2 is a schematic flowchart of a process of a method for generating configuration information according to an embodiment of the present application.

Step 201 to step 204 are a process of interaction between a network control unit and a first virtual built-in network element at a startup stage. Through the interaction process, the network control unit and the first virtual built-in network element can know a capability of each other.

201: The network control unit sends a capability query message to the first virtual built-in network element, where the capability query message is used to query whether the first virtual built-in network element has a virtual awareness report capability.

The virtual awareness report capability may refer to a capability that the first virtual built-in network element is aware of a change of a state of a first virtual machine and reports a virtual machine association message.

202: The first virtual built-in network element sends a capability response message to the network control unit, where the capability response message is used to indicate that the first virtual built-in network element has the virtual awareness report capability.

203: The network control unit sends a capability notification message to the first virtual built-in network element, where the capability notification message is used to indicate that the network control unit has a capability of processing a virtual machine association message.

204: The first virtual built-in network element sends a reply message to the network control unit, where the reply message is used to indicate that the capability notification message has been received.

It should be noted that, step 201 may not be performed, that is, the network control unit does not need to perform querying, and the first virtual built-in network element may proactively notify the network control unit that the first virtual built-in network element has the virtual awareness report capability. In addition, step 204 may not be performed, that is, the first virtual built-in network element may not send the reply message to the network control unit.

205: A server management unit sends a request message to a server, where the request message is used to request the server to perform an operation on the first virtual machine.

For example, the request message may be used to request the server to perform an operation, such as creation, deletion, migration, or attribute changing, on the first virtual machine.

206: The server sends a response message to the server management unit, where the response message includes indication information and an identifier of the first virtual machine, where the indication information is used to indicate that an operation can be performed on the first virtual machine.

For example, the server may detect a resource of the server and a state of a virtual machine, and if the server can perform an operation on the first virtual machine, the server sends the response message to the server management unit.

207: The server performs an operation on the first virtual machine.

Because the server performs an operation on the first virtual machine, the state of the first virtual machine changes.

208: The server management unit updates a correspondence table according to the identifier of the first virtual machine, and stores an updated correspondence table in a database.

The correspondence table may indicate a correspondence between the identifier of the first virtual machine and a network policy.

Step 207 and step 208 may be performed synchronously. Alternatively, step 208 may be performed first, and then step 207 is performed.

209: The first virtual built-in network element generates a virtual machine association message, where the virtual machine association message includes the identifier of the first virtual machine and an identifier of the first virtual built-in network element.

In the server, each virtual machine may connect to a specific virtual port of a virtual built-in network element. Therefore, when the server performs an operation on the first virtual machine and the state of the first virtual machine changes, the first virtual built-in network element can perceive the change, thereby generating the virtual machine association message. The virtual machine association message may include the identifier of the first virtual machine and the identifier of the first virtual built-in network element.

210: The first virtual built-in network element sends the virtual machine association message to the network control unit.

In FIG. 2, the first virtual built-in network element may directly communicate with the network control unit. Therefore, the first virtual built-in network element may directly send the virtual machine association message to the network control unit.

211: The network control unit determines first information according to the identifier of the first virtual machine, where the first information may include at least one of the following: a first forwarding entry, a location information mapping entry of the first virtual machine, and a first network policy.

Specifically, when the first information includes the first forwarding entry, the network control unit may determine an address of the first virtual machine according to the identifier of the first virtual machine; determine, according to the identifier of the first virtual built-in network element, an identifier of a first network element, and a network topology of a network including the first virtual built-in network element and the first network element, a first outbound port that is on the first network element and leads to the first virtual built-in network element; and generate the first forwarding entry for the first network element according to the address of the first virtual machine and the first outbound port, where a destination address of the first forwarding entry may include the address of the first virtual machine, and an outbound port of the first forwarding entry may include the first outbound port, where the address of the first virtual machine may include one or more of an IP address and a MAC address.

Figure 4:
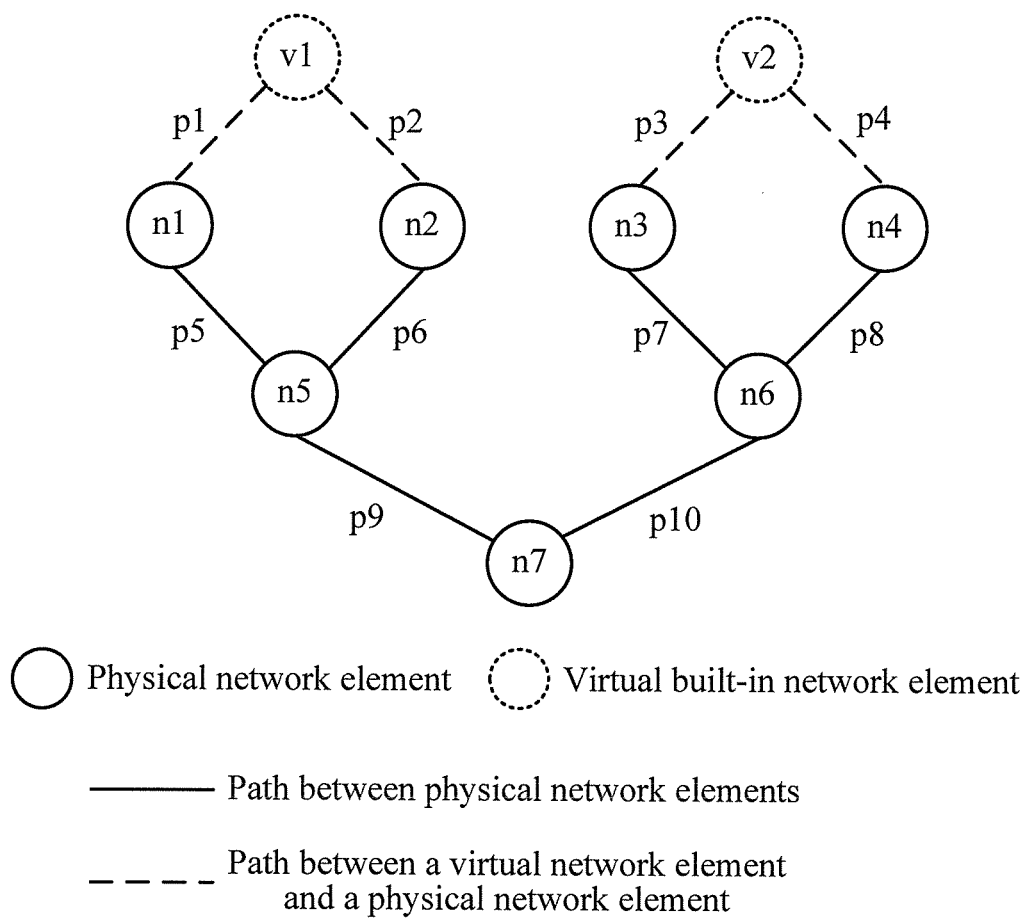
FIG. 4 is a schematic diagram of an example of a network topology according to an embodiment of the present application.

The network topology may include a physical network topology outside the server and a network topology in the server. The following describes the foregoing network topology in detail with reference to a specific example. FIG. 4 is a schematic diagram of an example of a network topology according to an embodiment of the present application.

As shown in FIG. 4, the network topology may include physical network elements, virtual built-in network elements, and path information. The physical network elements include n1 to n7. The virtual built-in network elements include v1 and v2. Paths between the virtual built-in network elements and the physical network elements may include p1 to p4, and paths between the physical network elements may include p5 to p10. The physical network elements may include an access switch, an aggregation switch, a gateway, and the like.

The network control unit may also determine the first network element according to a network topology in a network resource list. Table 1 is a schematic diagram of an example of the network resource list. It can be seen from Table 1 that, for the virtual built-in network element v1, associated network elements of the virtual built-in network element v1 are n1, n2, n5, and n7, and associated paths the virtual built-in network element v1 are p1, p2, p5, p6, and p9. The virtual built-in network element v2 is similar to the virtual built-in network element v1, which is not described in detail again. For example, when a state of a virtual machine connecting with the virtual built-in network element v1 changes, for example, the virtual machine is created on the virtual built-in network element v1 or migrates to the virtual built-in network element v1, the first network element may be any one of the following: n1, n2, n5, and n7. When a virtual machine connecting with the virtual built-in network element v2 changes, the first network element may be any one of the following: n3, n4, n6, and n7.

TABLE 1

Network resource list

| Identifier of a Virtual Built-in Network Element | Identifier of an Associated Network Element | Identifier of an Associated Path | Associated Topology |
|---|---|---|---|
| v1 | n1, n2, n5, n7 | p1, p2, p5, p6, p9 | 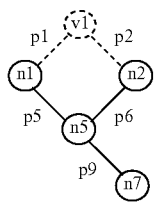 |
| v2 | n3, n4, n6, n7 | p3, p4, p7, p8, p10 | 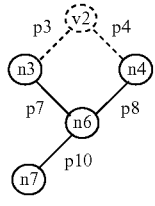 |
| ... | ... | ... | ... |

Specifically, when the first information includes the first network policy, the network control unit may search a correspondence table according to the identifier of the first virtual machine, and determine a network policy corresponding to the first virtual machine, where the correspondence table is used to indicate a correspondence between an identifier of a virtual machine and a network policy. The network control unit may determine the first network policy, where the first network policy includes a network policy corresponding to the first virtual machine. For example, the network control unit may search the correspondence table in the database according to the identifier of the first virtual machine, to determine an identifier of the network policy corresponding to the identifier of the first virtual machine, and search a network policy table according to the identifier of the network policy, to determine the network policy corresponding to the first virtual machine, thereby determining the first network policy.

Table 2 is a schematic diagram of an example of the network policy table according to the embodiment of the present application. As shown in Table 2, the network policy table may include N groups of network policies, where N is a positive integer. Each group of network policies may include a VLAN configuration, a bandwidth limitation configuration, a port isolation configuration, and a DHCP snooping configuration, and the like.

TABLE 2

Network policy table

| Identifier of a Network Policy Group | VLAN | Bandwidth Limitation | Port Isolation | DHCP Snooping | |
|---|---|---|---|---|---|
| 1 | 100 | 2M | Enabled | Enabled | ... |
| 2 | 200 | 10M | Disabled | Enabled | ... |
| ... | ... | ... | ... | ... | ... |
| N | 50 | 5M | Disabled | Disabled | ... |

For a process of determining, by the network control unit, the location information mapping entry of the first virtual machine, refer to the method embodiment in FIG. 1, which is not described in detail herein again.

212: The network control unit sends the first information to the first network element.

For example, when the first information includes the first forwarding entry, the network control unit may send a forwarding table including the first forwarding entry to the first network element. When the first information includes the location information mapping entry of the first virtual machine, the network control unit may send a virtual machine location information mapping table including the location information mapping entry of the first virtual machine to the first network element. When the first information includes the first network policy, the network control unit may send the first network policy to the first network element.

It should be understood that, sequence numbers of the foregoing processes do not indicate execution sequences, and the execution sequences of the processes should be determined according to functions and internal logic of the processes, and should not constitute any limitation to the implementation process of this embodiment of the present application.

In the embodiment of the present application, a network control unit determines first information according to an identifier of a first virtual machine, where a state of the first virtual machine changes and the identifier of the first virtual machine is included in a virtual machine association message, without the need of manual determining, thereby network configuration efficiency and network performance are improved.

Figure 3:
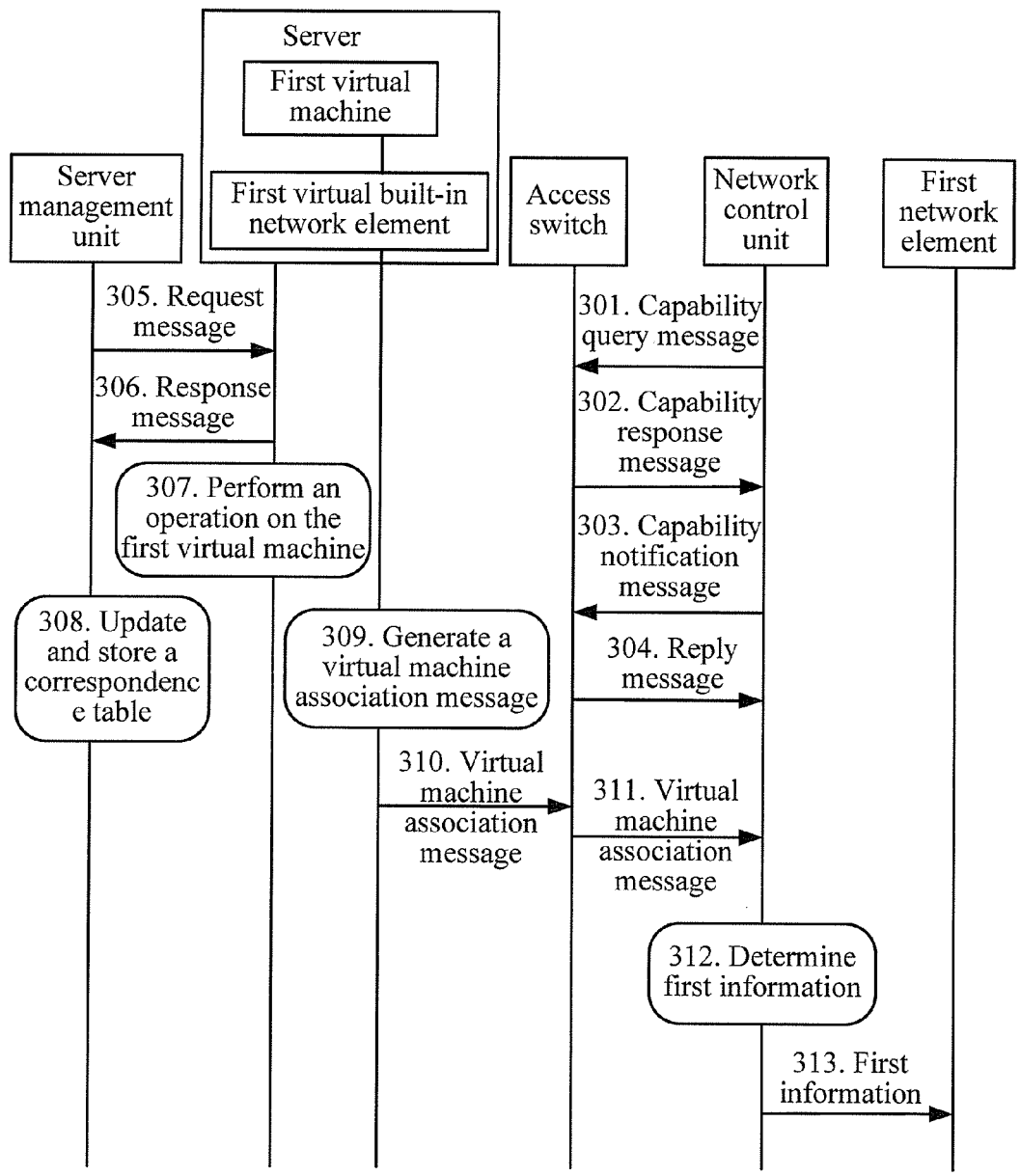
FIG. 3 is a schematic flowchart of a process of a method for generating configuration information according to an embodiment of the present application.

FIG. 3 is a schematic flowchart of a process of a method for generating configuration information according to an embodiment of the present application.

In the embodiment in FIG. 2, the network control unit centrally controls first virtual built-in network elements in the server, so that the network control unit can directly communicate with the first virtual built-in network elements. In this case, a first virtual built-in network element can directly send a virtual machine association message to the network control unit. However, in the embodiment in FIG. 3, a network control unit does not centrally control a first virtual built-in network element in a server. Therefore, the network control unit cannot directly communicate with a first virtual built-in network element. The following describes a process of the embodiment in FIG. 3.

Step 301 to step 304 are a process of interaction between the network control unit and an access switch at a startup stage. In FIG. 3, the network control unit needs to receive a virtual machine association message from an access switch. Therefore, during the interaction process at the startup stage, the network control unit and the access switch know a capability of each other. The interaction process is similar to the process of interaction between the network control unit and the first virtual built-in network element at the startup stage in step 201 to step 204 in FIG. 2, which is not described in detail herein again to avoid repetition.

Step 305 to step 309 are similar to step 205 to step 209 in FIG. 2, which are not described in detail again.

310: The first virtual built-in network element sends the virtual machine association message to the access switch.

For example, the first virtual built-in network element may send the virtual machine association message to the access switch by using a protocol such as the VDP or the LLDP, or a proprietary protocol.

311: The access switch sends a virtual machine association message to the network control unit.

The access switch may send a virtual machine association message to the network control unit by using a public protocol such as the OpenFlow protocol, the XMPP, the SNMP, the RSVP, or the Netconf protocol, or a proprietary protocol. An interaction protocol between the first virtual built-in network element and the access switch may be different from an interaction protocol between the access switch and the network control unit. Therefore, after receiving the virtual machine association message, the access switch may perform corresponding processing on the virtual machine association message based on the interaction protocol between the access switch and the network control unit, and send the processed virtual machine association message to the network control unit.

Step 312 to step 313 are similar to step 211 to step 212 in FIG. 2, which are not described in detail again.

In the embodiment of the present application, a network control unit determines first information according to an identifier of a first virtual machine, where a state of the first virtual machine changes and the identifier of the first virtual machine is included in a virtual machine association message, without the need of manual determining, thereby network configuration efficiency and network performance are improved.

Figure 5:
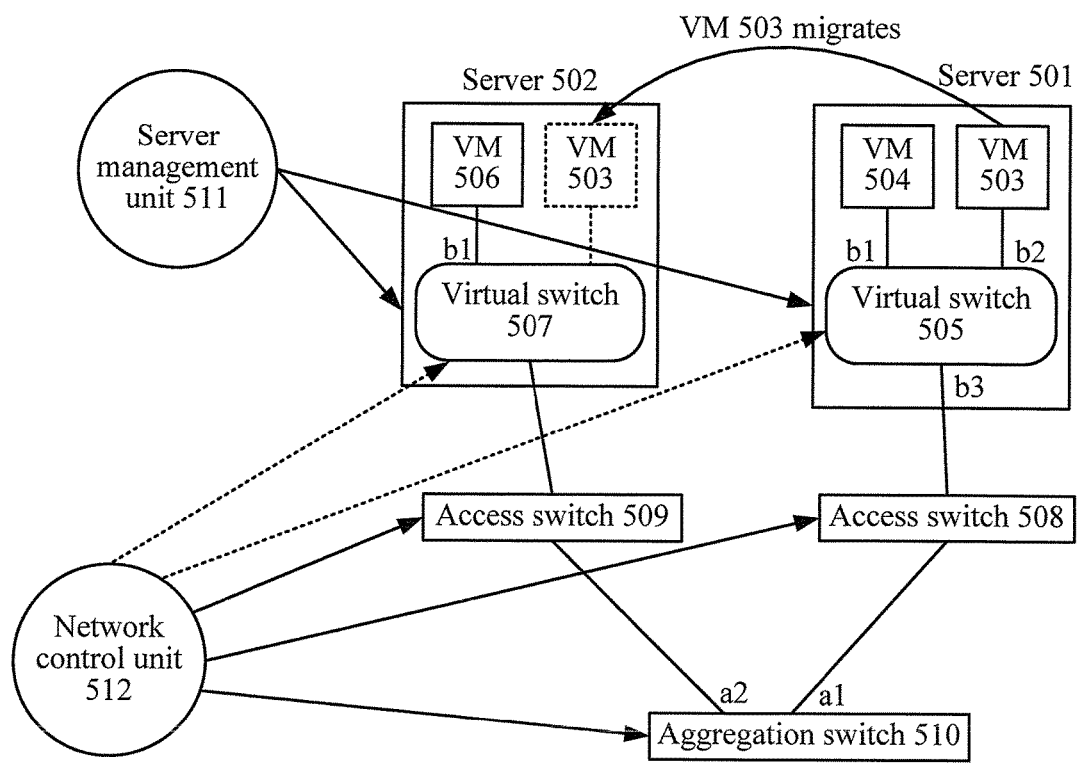
FIG. 5 is a schematic diagram of an example of a scenario to which an embodiment of the present application is applicable.

FIG. 5 is a schematic diagram of an example of a scenario to which an embodiment of the present application is applicable.

The scenario shown in FIG. 5 is a data center network, and the data center network may be a physical network. As shown in FIG. 5, a server 501 and a server 502 may be located in a same data center. The server 501 may include a VM 503, a VM 504, and a virtual switch 505, and the server 502 may include a VM 506 and a virtual switch 507.

In the server 501, both the VM 503 and the VM 504 connect to the virtual switch 505, and the virtual switch 505 connects to an access switch 508. The access switch 508 connects to an aggregation switch 510 though a port a1 of the aggregation switch 510.

In the server 502, the VM 506 connects to the virtual switch 507, the virtual switch 507 connects to an access switch 509, and the access switch 509 connects to the aggregation switch 510 through a port a2 of the aggregation switch 510.

A server management unit 511 may manage the server 501 and the server 502.

In the scenario shown in FIG. 5, it is assumed that the server management unit 511 may request to migrate the VM 503 to the server 502 from the server 501. Then, when the VM 503 migrates to the server 502 from the server 501, the virtual switch 507 may generate a virtual machine association message, and send the virtual machine association message to a network control unit 512. The virtual machine association message may include an identifier of the VM 503 and an identifier of the virtual switch 507. Because the scenario in FIG. 5 is a physical network, the network control unit 512 may determine, according to the virtual machine association message, a forwarding entry and a network policy that are related to the VM 503.

It is assumed that related information of the VM 503 is as follows: a MAC address of the VM 503 is 00-23-5A-15-99-42, an IP address of the VM 503 is 10.0.11.253, and a VLAN number is set to 100. The following describes content of the forwarding entry and that of the network policy with reference to the information, where the forwarding entry and the network policy are related to the VM 503 and are determined by the network control unit after a state of the VM 503 changes.

The following uses a Layer 2 forwarding table as an example for description. For example, Table 3 is a Layer 2 forwarding table of the aggregation switch 510 before the VM 503 migrates, and Table 4 is a Layer 2 forwarding table of the aggregation switch 510 after the VM 503 migrates. It can be seen from Table 3 and Table 4 that, before and after the VM 503 migrates, the VM 503 connects to the aggregation switch 510. Therefore, before and after the VM 503 migrates, neither the MAC address of the VM 503 nor the IP address of the VM 503 changes, but a corresponding port of the aggregation switch 510 changes. Before the VM 503 migrates, the VM 503 corresponds to the port a1 of the aggregation switch 510, and after the VM 503 migrates, the VM 503 corresponds to the port a2 of the aggregation switch 510.

TABLE 3

Layer 2 forwarding table of the aggregation
switch 510 before the VM 503 migrates

| MAC Address | Port Number |
|---|---|
| . . . | . . . |
| 00-23-5A-15-99-42 | a1 |
| 00-23-5A-15-10-75 | a1 |
| . . . | . . . |

TABLE 4

Layer 2 forwarding table of the aggregation
switch 510 after the VM 503 migrates

| MAC Address | Port Number |
|---|---|
| . . . | . . . |
| 00-23-5A-15-99-42 | a2 |
| 00-23-5A-15-10-75 | a1 |
| . . . | . . . |

In the foregoing Table 3 and Table 4, the MAC address 00-23-5A-15-10-75 may be a MAC address of the VM 504, the VM 504 corresponds to the port a1 of the aggregation switch 510, and because the VM 504 does not change, an entry that is in the Layer 2 forwarding table of the aggregation switch and is corresponding to the VM 504 is not updated. A specific value of the foregoing MAC address is only an example for description but is not intended to limit the scope of this embodiment of the present application.

Table 5 is a Layer 2 forwarding table of the virtual switch 505 before the VM 503 migrates. Table 6 is a Layer 2 forwarding table of the virtual switch 505 after the VM 503 migrates. Before the VM 503 migrates, the VM 503 corresponds to a port b2 of the virtual switch 505. After the VM 503 migrates, the VM 503 corresponds to a port b3 of the virtual switch 505.

TABLE 5

Layer 2 forwarding table of the virtual
switch 505 before the VM 503 migrates

| MAC Address | Port Number |
|---|---|
| . . . | . . . |
| 00-23-5A-15-99-42 | b2 |
| 00-23-5A-15-10-75 | b1 |
| . . . | . . . |

TABLE 6

Layer 2 forwarding table of the virtual
switch 505 after the VM 503 migrates

| MAC Address | Port Number |
|---|---|
| . . . | . . . |
| 00-23-5A-15-99-42 | b3 |
| 00-23-5A-15-10-75 | b1 |
| . . . | . . . |

Other entries in the foregoing Table 5 and Table 6 may correspond to other virtual machines and are only used as examples for describing the content of the Layer 2 forwarding tables.

After the state of the VM 503 changes, an address resolution protocol (ARP) table may also change. For example, an ARP table of the virtual switch 505 may change. Table 7 is an ARP table of the virtual switch 505 before the VM 503 migrates, and Table 8 is an ARP table of the virtual switch 505 after the VM 503 migrates. It can be seen from Table 7 and Table 8 that, after the VM 503 migrates, no entry corresponding to the VM 503 exists in the ARP table of the virtual switch 505.

TABLE 7

ARP table of the virtual switch 505 before the VM 503 migrates

| IP Address | MAC Address |
|---|---|
| . . . | . . . |
| 10.0.11.200 | 00-23-BA-30-22-59 |
| 10.0.11.253 | 00-23-5A-15-99-42 |
| 10.0.11.254 | 00-23-7E-30-41-AF |
| . . . | . . . |

TABLE 8

ARP table of the virtual switch 505 after the VM 503 migrates

| IP Address | MAC Address |
|---|---|
| . . . | . . . |
| 10.0.11.200 | 00-23-BA-30-22-59 |
| 10.0.11.254 | 00-23-7E-30-41-AF |
| . . . | . . . |

Other entries in the foregoing Table 7 and Table 8 may correspond to other virtual machines in the network and are only used as examples for describing the content of the ARP tables.

Content of a Layer 3 forwarding table is similar to that of the foregoing Layer 2 forwarding tables, which is not described in detail herein again.

The following uses the VLAN number configuration in the network policy as an example for describing the content of the network policy determined by the network control unit after the state of the VM 503 changes. Table 9 is a VLAN configuration of the aggregation switch 510 before the VM 503 migrates, and Table 10 is a VLAN configuration of the aggregation switch 510 after the VM 503 migrates. As shown in Table 9 and Table 10, before the VM 503 migrates, a VLAN number corresponding to the port a1 of the aggregation switch 510 includes a VLAN number 100 corresponding to the VM 503. After the VM 503 migrates, the VM 503 corresponds to the port a2 of the aggregation switch 510. Therefore, a VLAN number corresponding to the port a2 of the aggregation switch 510 includes the VLAN number 100 corresponding to the VM 503.

TABLE 9

VLAN configuration of the aggregation
switch 510 before the VM 503 migrates

| Port Number | VLAN ID |
|---|---|
| 1 | 25, 67, . . . |
| . . . | . . . |
| a1 | . . . , 90, 100, 102, . . . |
| a2 | . . . , 80, 200, . . . |
| . . . | . . . |

TABLE 10

VLAN configuration of the aggregation
switch 510 after the VM 503 migrates

| Port Number | VLAN |
|---|---|
| 1 | 25, 67, . . . |
| . . . | . . . |
| a1 | . . . , 90, 102, . . . |
| a2 | . . . , 80, 100, 200, . . . |
| . . . | . . . |

Other entries in Table 9 and Table 10 may correspond to other virtual machines in the network and are only used as examples.

It should be understood that, the foregoing examples in Table 3 to Table 10 are merely intended to help a person skilled in the art to better understand the embodiment of the present application rather than to limit the scope of the embodiment of the present application. In the embodiment of the present application, after a state of a virtual machine changes, not only a forwarding entry and a network policy may be determined for the network elements listed above, but also a forwarding entry and a network policy may be determined for other network elements in the network. A determining manner is similar to that of the foregoing examples, which is not described in detail herein again.

In the embodiment of the present application, a network control unit determines first information according to an identifier of a first virtual machine, where a state of the first virtual machine changes and the identifier of the first virtual machine is included in a virtual machine association message, without the need of manual determining, thereby network configuration efficiency and network performance are improved.

The embodiment of the present application is not only applicable to a physical network, but also applicable to a virtual network.

In a large-scale data center network, there are generally some problems, for example, a problem such as a limitation to a MAC address entry of a switch or an ARP broadcast storm. To resolve the foregoing problem, in the large-scale data center network, a virtual network may be formed by using a Layer 3 tunneling technology. Generally, a virtual network may include multiple network elements such as NVE nodes. An NVE node is a network element configured for Layer 3 tunnel encapsulation and decapsulation. In the virtual network, NVE nodes may connect to each other directly, or may connect to each other through other intermediate network elements. These intermediate network elements are only configured for simple forwarding and not for decapsulation.

Generally, when an NVE node needs to join a virtual network, the NVE node may send, to a network control unit, a notification message used to indicate that the NVE node needs to join the virtual network. After receiving the notification message of the NVE node, the network control unit may notify another NVE node in the virtual network that a new NVE node is to join the virtual network. When all virtual machines, the numbers of hops from which to an NVE node are the smallest, no longer belong to a virtual network, the NVE node also needs to exit the virtual network. During the exiting, the NVE node may send, to the network control unit, a notification message used to indicate that the NVE node needs to exit the virtual network. After receiving the notification message, the network control unit may notify another NVE node in the virtual network that the NVE node is to exit the virtual network. Therefore, the network control unit may also control the virtual network.

Figure 6:
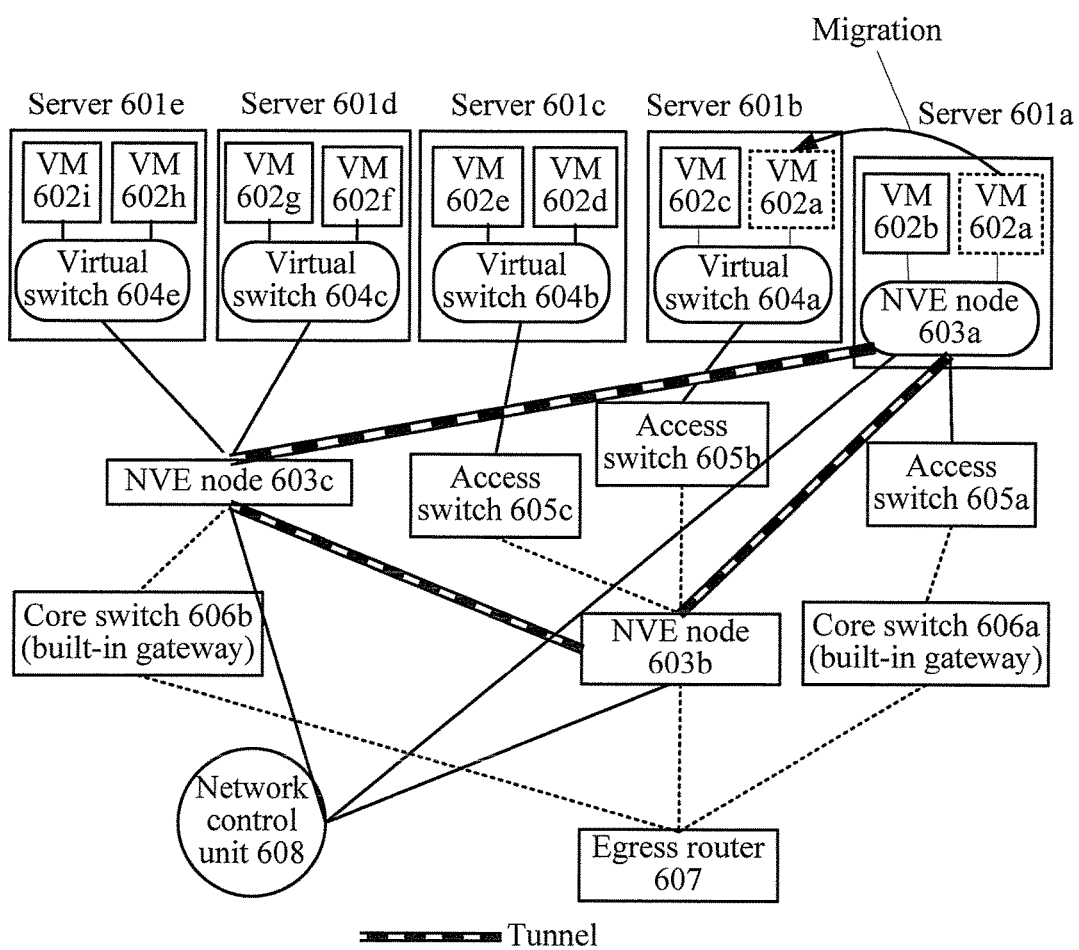
FIG. 6 is a schematic diagram of another example of a scenario to which an embodiment of the present application is applicable.

FIG. 6 is a schematic diagram of another example of a scenario to which an embodiment of the present application is applicable.

The scenario shown in FIG. 6 may be a scenario in which a virtual network is deployed in a data center network. It should be understood that, for ease of description, not all existing network elements, for example, an aggregation switch and a core router, are shown in FIG. 6. A network control unit may control all network elements in a network. For ease of description, not all connections between the network control unit and all the network elements are shown in FIG. 6. The following describes related content of the virtual network in detail.

3 NVE nodes, that is, NVE nodes 603*a*, 603*b*, and 603*c*, are shown in FIG. 6. The NVE node 603*a* may be deployed in a server 601*a*. The NVE node 603*b* and the NVE node 603*c* may be deployed outside the server, for example, may be deployed on a physical switch or a physical router. The physical switch may include an access switch, an aggregation switch, or a core switch. The physical router may include a core router, an egress router, or the like. For example, in FIG. 6, the NVE node 603*b* may be deployed on a core switch, and the NVE node 603*c* may be deployed on an access switch.

The NVE nodes 603*a*, 603*b*, and 603*c* may form a virtual network together by using tunnels. Each virtual network has its own VNID, for example, a VNID of a virtual network including the NVE nodes 603*a*, 603*b*, and 603*c* shown in FIG. 6 may be 8. The virtual network may further include a virtual machine, the number of hops from which to each NVE node is the smallest.

In FIG. 6, when a VM 602*a* migrates to a server 601*b* from the server 601*a*, a network policy and a forwarding entry that are related to the VM 602*a* change. Therefore, a network control unit 608 may determine first information for a first network element, where the first information may include at least one of the following: the network policy related to the VM 602*a*, the forwarding entry related to the VM 602*a*, and a virtual machine location information mapping entry related to the VM 602*a*.

When the first information includes different content, the first network element may be a different network element. For example, when the first information includes the forwarding entry related to the VM 602*a*, the first network element may be any network element in the network in FIG. 6, for example, may be an access switch 605*a*, an access switch 605*b*, a core switch 606*a*, or an egress router 607. Because the VM 602*a* migrates to the server 601*b* from the server 601*a*, an NVE node, the number of hops from which to the VM 602*a* is the smallest, also changes. Before the migration, the number of hops from the NVE node 603*a* to the VM 602*a* is the smallest, and after the migration, the number of hops from the NVE node 603*b* to the VM 602*a* is the smallest. Therefore, the first network element may also be a network element on a path between the VM 602*a* and an NVE node corresponding to the VM 602*a*, or a network element on a path between the VM 602*a* and the NVE node 603*b*, for example, may be a virtual switch 604*a* or the access switch 605*b*. The first network element may further be an NVE node in a virtual network to which the VM 602*a* belongs, that is, an NVE node having a same VNID as the VM 602*a*, for example, may be the NVE node 603*a*, the NVE node 603*b*, or the NVE node 603*c*.

For another example, when the first information includes the forwarding entry related to the VM 602*a*, the first network element may be an NVE node having a same VNID as the VM 602*a*, for example, may be the NVE node 603*a*, the NVE node 603*b*, or the NVE node 603*c*.

The scenario in FIG. 6 further includes some other virtual machines, for example, VMs 602*c* to 602*i*, an access switch 605*c*, a core switch 606*b*. For functions and operations of the virtual machines, refer to the foregoing descriptions and the prior art, which are not described in detail herein again.

The virtual network may be deployed in a data center network, for example, the scenario shown in FIG. 6. The virtual network may also be deployed between data center networks, and used for communication between the data center networks. The following describes the scenario with reference to a specific example.

Figure 7:
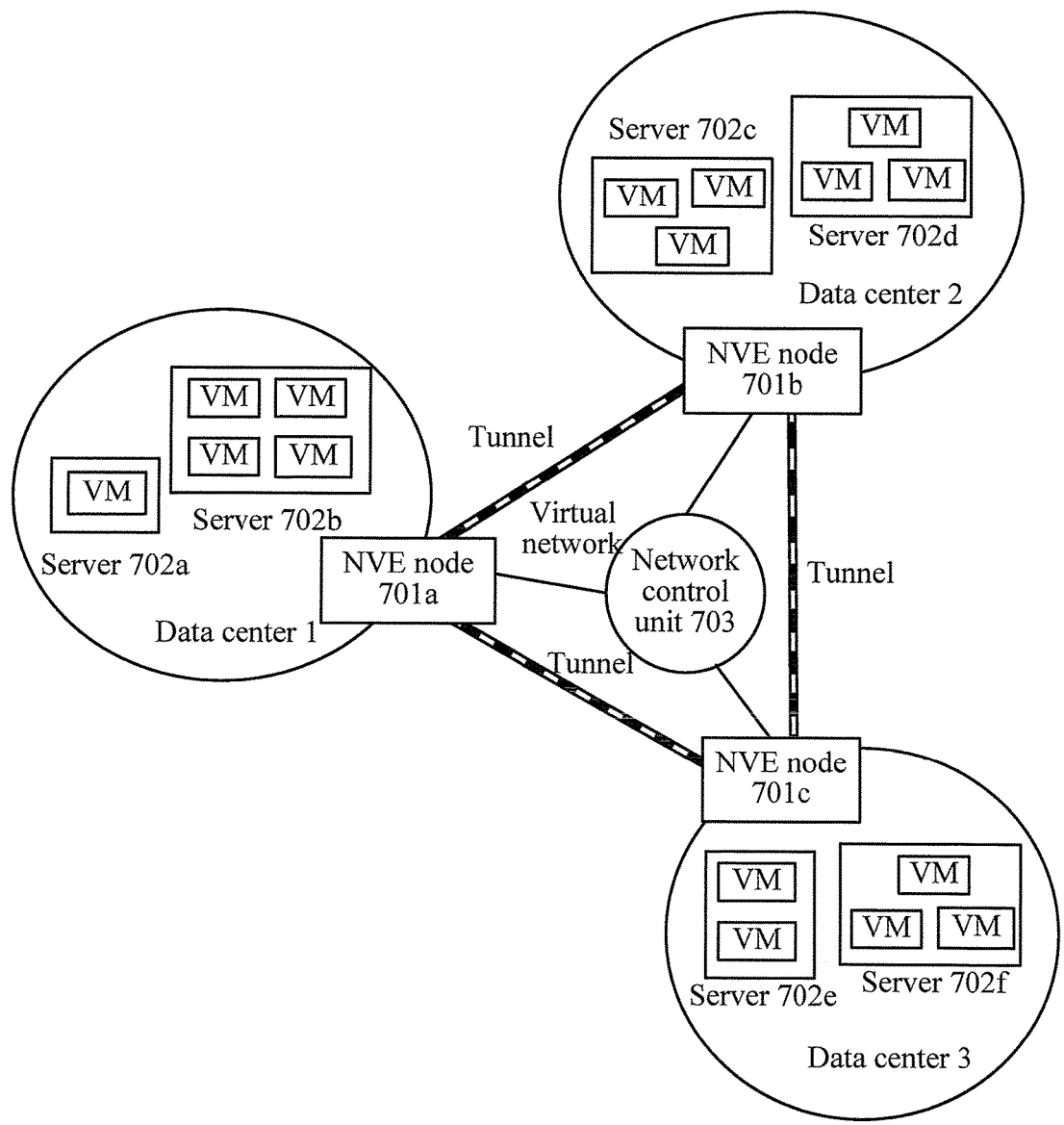
FIG. 7 is a schematic diagram of another example of a scenario to which an embodiment of the present application is applicable.

FIG. 7 is a schematic diagram of another example of a scenario to which an embodiment of the present application is applicable.

In FIG. 7, a virtual network is deployed between data center networks. As shown in FIG. 7, the scenario may include 3 data centers, and each data center may include multiple servers, for example, a data center 1 may include servers 702a and 702b, a data center 2 may include servers 702c and 702d, and a data center 3 may include servers 702e and 702f. Each server may include one or more virtual machines, as shown in FIG. 7.

An NVE node 701a may be located in the data center 1, and similar to the scenario in FIG. 6, the NVE node 701a may be deployed in a physical switch of the data center 1, a physical router of the data center 1, a server of the data center 1, or the like of the data center 1.

An NVE node 701b may be located in the data center 2, and an NVE node 701c may be located in the data center 3. An NVE node is the last node in a Layer 2 network, and the first node in a Layer 3 network, and each NVE node may correspond to a different network segment address. The three NVE nodes are interconnected by using tunnels to form a virtual network. A network control unit 703 may control the NVE nodes 701a to 701c.

It should be noted that, for ease of description, three data centers are shown in FIG. 7, and each data center has one NVE node. However, in this embodiment of the present application, there may be more or less data centers, and each data center may also have more NVE nodes.

With reference to a specific example, the following describes content of a virtual machine location information mapping entry related to a virtual machine and determined by a network control unit after a state of the virtual machine changes in a data center in which a virtual network is deployed.

Figure 8:
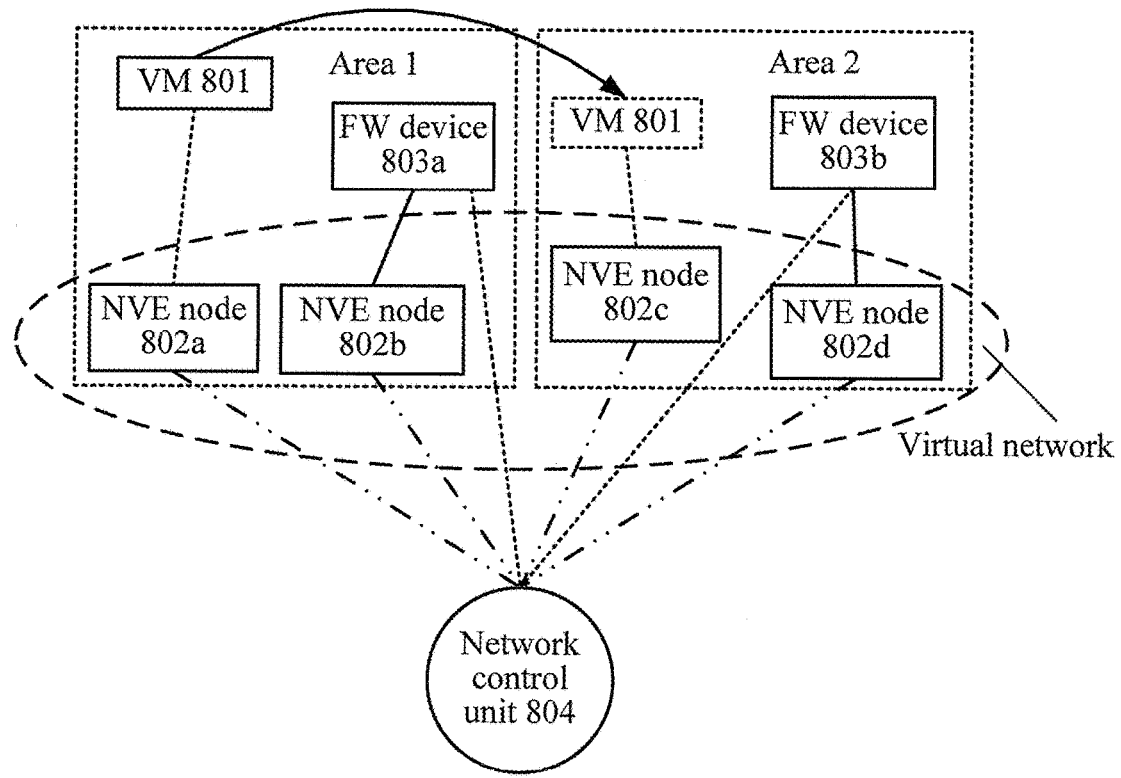
FIG. 8 is a schematic diagram of an example of a simplified virtual network scenario to which an embodiment of the present application is applicable.

FIG. 8 is a schematic diagram of an example of a simplified virtual network scenario to which an embodiment of the present application is applicable.

As shown in FIG. 8, there are two areas, and there are a VM 801, NVE nodes 802a and 802b, and a firewall (FW) device 803a in an area 1.

An NVE node, the number of hops from which to the VM 801 is the smallest, may be the NVE node 802a. It should be noted that, the VM 801 and the NVE node 802a may directly connect to each other, or may connect to each other through one or more other network elements.

A network control unit 804 may control each network element in FIG. 8. It should be noted that, for ease of description, there are two NVE nodes in each area in FIG. 8. However, in this embodiment of the present application, there may also be more or less NVE nodes in each area.

There are NVE nodes 802c and 802d and an FW device 803b in an area 2. The NVE node 802a to the NVE node 802d may form a virtual network.

The foregoing FW devices belong to network service devices, and can be configured to supervise firewalls at the fourth layer to the seventh layer of the OSI model. For example, the FW device 803a may perform firewall supervision on a virtual machine in the area 1, and the FW device 803b may perform firewall supervision on a virtual machine in the area 2.

It is assumed that, in the scenario shown in FIG. 8, the VM 801 needs to migrate to the area 2 from the area 1. Then, an NVE node, the number of hops from which to the VM 801 is the smallest, changes to the NVE node 802c. After the VM 801 migrates, the network control unit 804 may determine a virtual machine location information mapping entry related to the VM 801.

With reference to an example, the following describes content of the virtual machine location information mapping entry related to the VM 801 and determined by the network control unit 804 after the VM 801 migrates. It is assumed that basic information of the VM 801 is as follows: MAC address: 00-23-5A-15-99-42; IP address: 10.0.11.253; and VNID: 12.

It is assumed that an IP address of the NVE node 802a is 10.23.4.68, an IP address of the NVE node 802c is 10.0.11.2, and an identifier VNID of the virtual network is 12.

Table 11 is a virtual machine location information mapping table of the NVE node 802a before the VM 801 migrates, and Table 12 is a virtual machine location information mapping table of the NVE node 802a after the VM 801 migrates.

TABLE 11

Virtual machine location information mapping table of the NVE node 802a before the VM 801 migrates

| IP Address of a VM | MAC Address of the VM | IP Address of a Corresponding NVE Node | VNID |
|---|---|---|---|
| ... | ... | ... | ... |
| 192.14.20.3 | 00-23-BA-30-22-59 | 192.14.20.1 | 36 |
| 10.0.11.253 | 00-23-5A-15-99-42 | 10.23.4.68 | 12 |
| 10.2.34.2 | 00-23-7E-30-41-AF | 10.2.34.1 | 5 |
| ... | ... | ... | ... |

TABLE 12

Virtual machine location information mapping table of the NVE node 802a after the VM 801 migrates

| IP Address of a VM | MAC Address of the VM | IP Address of a Corresponding NVE Node | VNID |
|---|---|---|---|
| ... | ... | ... | ... |
| 192.14.20.3 | 00-23-BA-30-22-59 | 192.14.20.1 | 36 |
| 10.0.11.253 | 00-23-5A-15-99-42 | 10.0.11.2 | 12 |
| 10.2.34.2 | 00-23-7E-30-41-AF | 10.2.34.1 | 5 |
| ... | ... | ... | ... |

Other entries in the foregoing Table 11 and Table 12 may correspond to other entries in the network and are only used as examples.

Table 13 is a virtual machine location information mapping table of the NVE node 802c before the VM 801 migrates, and Table 14 is a virtual machine location information mapping table of the NVE node 802c after the VM 801 migrates.

TABLE 13

Virtual machine location information mapping table of the NVE node 802c before the VM 801 migrates

| IP Address of a VM | MAC Address of the VM | IP Address of a Corresponding NVE Node | VNID |
|---|---|---|---|
| ... | ... | ... | ... |
| 192.3.7.22 | 00-23-A5-37-24-7F | 192.3.7.1 | 36 |
| 10.0.11.253 | 00-23-5A-15-99-42 | 10.23.4.68 | 12 |
| 10.2.17.77 | 00-23-7E-98-31-E0 | 10.2.17.1 | 44 |
| ... | ... | ... | ... |

TABLE 14

Virtual machine location information mapping table of the NVE node 802c after the VM 801 migrates

| IP Address of a VM | MAC Address of the VM | IP Address of a Corresponding NVE Node | VNID |
|---|---|---|---|
| ... | ... | ... | ... |
| 192.3.7.22 | 00-23-A5-37-24-7F | 192.3.7.1 | 36 |
| 10.0.11.253 | 00-23-5A-15-99-42 | 10.0.11.2 | 12 |
| 10.2.17.77 | 00-23-7E-98-31-E0 | 10.2.17.1 | 44 |
| ... | ... | ... | ... |

Table 15 is a virtual machine location information mapping table of the NVE node 802b before the VM 801 migrates, and Table 16 is a virtual machine location information mapping table of the NVE node 802b after the VM 801 migrates.

TABLE 15

Virtual machine location information mapping table of the NVE node 802b before the VM 801 migrates

| IP Address of a VM | MAC Address of the VM | IP Address of a Corresponding NVE Node | VNID |
|---|---|---|---|
| ... | ... | ... | ... |
| 192.3.7.45 | 00-23-5F-37-24-75 | 192.3.7.1 | 12 |
| 10.0.11.253 | 00-23-5A-15-99-42 | 10.23.4.68 | 12 |
| 10.2.17.26 | 00-23-7E-98-DA-5F | 10.2.33.1 | 54 |
| ... | ... | ... | ... |

TABLE 16

Virtual machine location information mapping table of the NVE node 802b after the VM 801 is migrated

| IP Address of a VM | MAC Address of the VM | IP Address of a Corresponding NVE Node | VNID |
|---|---|---|---|
| ... | ... | ... | ... |
| 192.14.20.3 | 00-23-5F-37-24-75 | 192.3.7.1 | 36 |
| 10.0.11.253 | 00-23-5A-15-99-42 | 10.0.11.2 | 12 |
| 10.2.17.26 | 00-23-7E-98-DA-5F | 10.2.33.1 | 54 |
| ... | ... | ... | ... |

Table 17 is a virtual machine location information mapping table of the NVE node 802d before the VM 801 migrates, and Table 18 is a virtual machine location information mapping table of the NVE node 802d after the VM 801 migrates.

TABLE 17

Virtual machine location information mapping table of the NVE node 802d before the VM 801 migrates

| IP Address of a VM | MAC Address of the VM | IP Address of a Corresponding NVE Node | VNID |
|---|---|---|---|
| ... | ... | ... | ... |
| 192.3.7.45 | 00-23-5F-37-42-7A | 192.22.83.2 | 21 |
| 10.0.11.253 | 00-23-5A-15-99-42 | 10.23.4.68 | 12 |
| 10.2.17.26 | 00-23-7E-87-E9-59 | 10.2.200.43 | 5 |
| ... | ... | ... | ... |

TABLE 18

Virtual machine location information mapping table of the NVE node 802d after the VM 801 migrates

| IP Address of a VM | MAC Address of the VM | IP Address of a Corresponding NVE Node | VNID |
|---|---|---|---|
| ... | ... | ... | ... |
| 192.14.20.3 | 00-23-5F-37-42-7A | 192.22.83.2 | 21 |
| 10.0.11.253 | 00-23-5A-15-99-42 | 10.0.11.2 | 12 |
| 10.2.17.26 | 00-23-7E-87-E9-59 | 10.2.200.43 | 5 |
| ... | ... | ... | ... |

It can be seen from Table 11 to Table 18 that, before the VM 801 migrates, both the MAC address of the VM 801 and the IP address of the VM 801 correspond to the IP address of the NVE node 802a. After the VM 801 migrates, both the MAC address of the VM 801 and the IP address of the VM 801 correspond to the IP address of the NVE node 802c. Therefore, in Table 12, Table 14, Table 16, and Table 18, after the VM 801 migrates, virtual machine location information mapping entries of the VM 801 that are determined by the network control unit 804 include the MAC address of the VM 801, the IP address of the VM 801, the IP address of the NVE node 802c, and the VNID.

Other entries in the foregoing Table 11 to Table 18 may correspond to other virtual machines in the network and are only used as examples for describing the content of the virtual machine location information mapping tables herein.

In the virtual network, the network control unit may send network policies of the fourth layer to the seventh layer of the OSI model to network service devices, and each network service device implements a network policy function that the network service device is responsible for. For example, in FIG. 8, the network control unit 804 may send a firewall policy to the FW device 803a and the FW device 803b. The FW device 803a and the FW device 803b implement a firewall function, and the FW device 803a and the FW device 803b are two network service devices.

By using a firewall configuration as an example, the following describes content of a network policy determined by the network control unit 804 after the VM 801 migrates. Table 19 is a security list of the FW device 803a before the VM 801 migrates, and Table 20 is a security list of the FW device 803a after the VM 801 migrates. As shown in Table 19, a security policy corresponding to the VM 801 is that the number of the UDP (User Datagram Protocol)<1000 pps (the number of data packets forwarded per second). After the VM 801 migrates to the area 2, the FW device 803b is responsible for implementing a firewall of the area 2. Therefore, after the VM 801 migrates, the security list of the FW device 803a no longer includes an entry corresponding to the VM 801.

TABLE 19

Security list of the FW device 803a before the VM 801 migrates

| IP Address | Security Policy |
|---|---|
| ... | ... |
| 10.0.11.252 | UDP packets < 500 pps |
| 10.0.11.253 | UDP packets < 1000 pps |
| 10.0.11.254 | UDP packets < 300 pps |
| ... | ... |

TABLE 20

Security list of the FW device 803a after the VM 801 migrates

| IP Address | Security Policy |
|---|---|
| . . . | . . . |
| 10.0.11.252 | UDP packets < 500 pps |
| 10.0.11.254 | UDP packets < 300 pps |
| . . . | . . . |

Table 21 is a security list of the FW device 803b before the VM 801 migrates, and Table 22 is a security list of the FW device 803b after the VM 801 migrates. After the VM 801 migrates to the area 2, the FW device 803b is responsible for implementing the firewall of the area 2. Therefore, after the VM 801 migrates, the entry corresponding to the VM 801 is added to the security list of the FW device 803b.

TABLE 21

Security list of the FW device 803b after the VM 801 migrates

| IP Address | Security Policy |
|---|---|
| . . . | . . . |
| 10.0.10.3 | UDP packets < 500 pps |
| 10.0.22.55 | UDP packets < 300 pps |
| . . . | . . . |

TABLE 22

Security list of the FW device 803b before the VM 801 migrates

| IP Address | Security Policy |
|---|---|
| . . . | . . . |
| 10.0.10.3 | UDP packets < 500 pps |
| 10.0.11.253 | UDP packets < 1000 pps |
| 10.0.22.55 | UDP packets < 300 pps |
| . . . | . . . |

Other entries in the foregoing Table 19 to Table 22 may correspond to other virtual machines in the network and are only used as examples for describing the content of the security lists herein.

It should be understood that, for ease of description, Table 19 to Table 22 only show content of the firewall configuration. In this embodiment of the present application, a process of a configuration such as load balancing or network address translation, which is in the network policy and is determined by the network control unit is similar to that of determining the firewall configuration, which is not described in detail herein again.

In a physical network, implementation of network policies of the fourth layer to the seventh layer of the OSI model may also be implemented by network service devices. After a state of a virtual machine changes, a network control unit may send a determined network policy to the network service devices. A specific process is similar to that in the embodiment in FIG. 8, which is not described in detail herein again.

In the foregoing embodiments in FIG. 1 to FIG. 8, interaction between a network control unit and a network element may be implemented based on an existing protocol or a proprietary protocol, for example, the SNMP, the Netconf, the openflow, the XMPP, or the RSVP. The following describes an interaction message between the network control unit and the network element in detail by using the openflow protocol as an example.

Figure 9A:
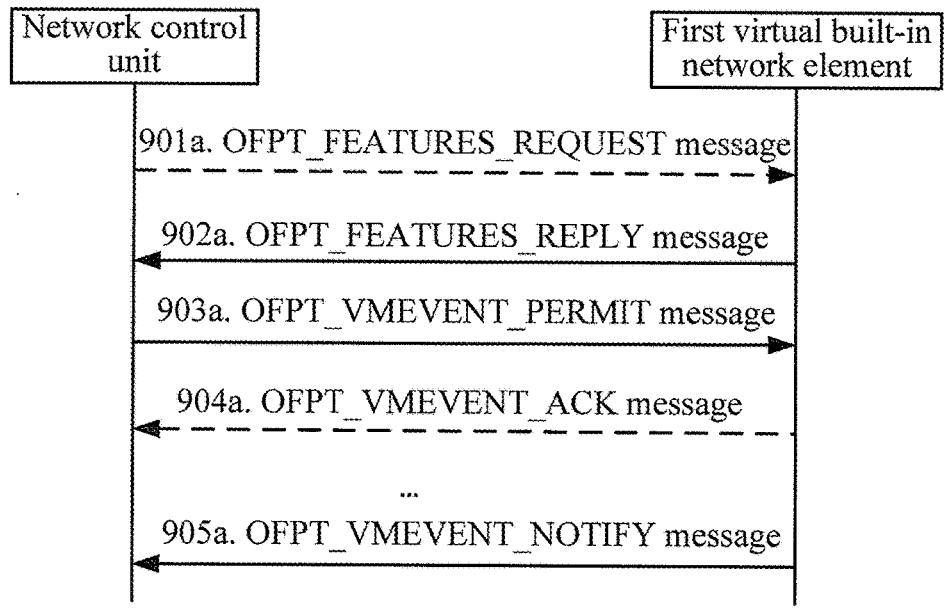
FIG. 9a shows a process of interaction between a network control unit and a first virtual built-in network element according to an embodiment of the present application.

FIG. 9a is a process of interaction between a network control unit and a first virtual built-in network element according to an embodiment of the present application.

In FIG. 9a, it is assumed that the network control unit can directly communicate with the first virtual built-in network element, and it is assumed that the openflow protocol is used during a process of communication between the network control unit and the first virtual built-in network element.

901a: The network control unit sends an OFPT_FEATURES_REQUEST message to the first virtual built-in network element, where the OFPT_FEATURES_REQUEST message is used to query whether the first virtual built-in network element has a virtual awareness report capability.

902a: The first virtual built-in network element sends an OFPT_FEATURES_REPLY message to the network control unit, where the OFPT_FEATURES_REPLY message is used to indicate that the first virtual built-in network element has the virtual awareness report capability.

903a: The network control unit sends an OFPT_VMEVENT_PERMIT message to the first virtual built-in network element, where the OFPT_VMEVENT_PERMIT message is used to indicate that the network control unit has a capability of processing a virtual machine association message.

904a: The first virtual built-in network element sends an OFPT_VMEVENT_ACK message to the network control unit, where the OFPT_VMEVENT_ACK message is used to indicate that a capability notification message has been received.

Step 904a may also not be performed.

905a: The first virtual built-in network element sends an OFPT_VMEVENT_NOTIFY message to the network control unit, where the OFPT_VMEVENT_NOTIFY message is the foregoing virtual machine association message, and the OFPT_VMEVENT_NOTIFY message may include an identifier of a first virtual machine and an identifier of the first virtual built-in network element.

Figure 9B:
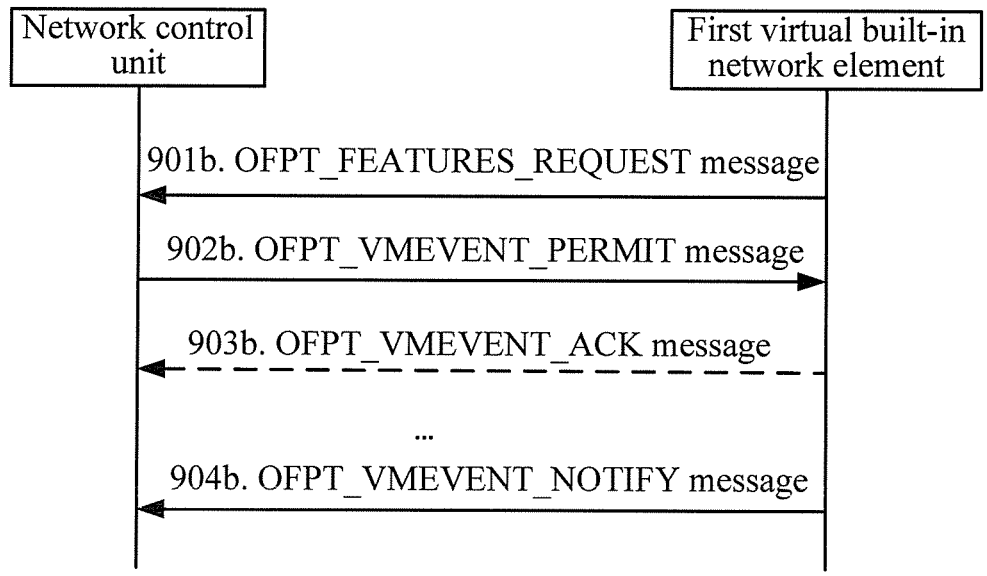
FIG. 9b shows a process of interaction between a network control unit and a first virtual built-in network element according to an embodiment of the present application.

FIG. 9b is a process of interaction between a network control unit and a first virtual built-in network element according to an embodiment of the present application.

In FIG. 9b, it is assumed that the network control unit can directly communicate with the first virtual built-in network element, and it is assumed that the openflow protocol is used during a process of communication between the network control unit and the first virtual built-in network element.

901b: The first virtual built-in network element sends an OFPT_FEATURES_REQUEST message to the network control unit, where the OFPT_FEATURES_REQUEST message is used to query whether the network control unit has a capability of processing a virtual machine association message.

Step 902b to step 904b are similar to step 903a to step 905a, which are not described in detail herein again.

The following gives a definition of each message in FIG. 9a and FIG. 9b and an example of a message structure.

(1) OFPT_FEATURES_REPLY //notifying that it has a virtual awareness report capability
 OFPT_VMEVENT_PERMIT = 30, //notifying that it has a capability of processing a virtual machine association message

```
        OFPT_VMEVENT_REQUEST = 31, //querying whether a network control unit has a
capability of processing the virtual machine association message
        OFPT_VMEVENT_NOTIFY = 32, //the virtual machine association message
        OFPT_VMEVENT_ACK = 33, //acknowledging that an OFPT_VMEVENT_PERMIT
message has been received
        (2) A structure of the OFPT_FEATURES_REPLY message is as follows:
        enum ofp_capabilities {
        OFPC_FLOW_STATS = 1 << 0,        /*flow statistics*/
        OFPC_TABLE_STATS = 1 << 1,       /*table statistics*/
        OFPC_PORT_STATS = 1 << 2,        /*port statistics*/
        OFPC_GROUP_STATS = 1 << 3,       /*group statistics*/
        OFPC_IP_REASM = 1 << 5,          /*an IP data packet can be reassembled */
        OFPC_QUEUE_STATS = 1 << 6,       /*queue statistics*/
        OFPC_PORT_BLOCKED = 1 << 8    /*a switch allows a port to be blocked to avoid a
loop */
        OFPC_VM_EVENT = 1 << 9          /*indicating whether it has a virtual awareness
report capability */
        };
        (3) a structure of the OFPT_VMEVENT_PERMIT message
        struct ofp_vmevent_permit {
        struct ofp_header header;
        };
        (4) a structure of the OFPT_VMEVENT_REQUEST message
        struct ofp_vmevent_request {
        struct ofp_header header;
        };
        (5) a structure of the OFPT_VMEVENT_ACK message
        struct ofp_vmevent_reply {
        struct ofp_header header;
        uint32_t reply_code;
        };
        (6) a structure of the OFPT_VMEVENT_NOTIFY message
        struct ofp_vmevent_notify {
        struct ofp_header header;
        uint32_t xxxx;  /*including an identifier of a first virtual built-in network element and
an identifier of a first virtual machine; and further including an identifier of a first virtual network*/
        };
```

It should be understood that, when the network control unit cannot directly communicate with the first virtual built-in network element, as shown in FIG. 3, the network control unit and an access switch complete an interaction process at a startup stage. Therefore, the processes in FIG. 9a and FIG. 9b are also applicable to interaction between the network control unit and the access switch, which are not described in detail herein again to avoid repetition.

Figure 10:
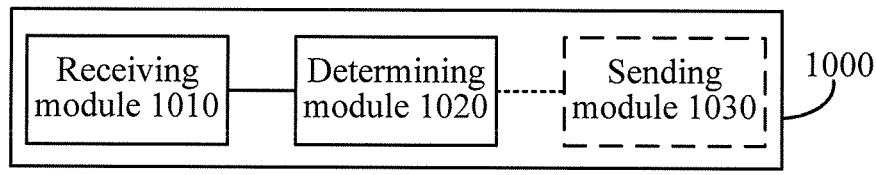
FIG. 10 is a schematic block diagram of a network control unit according to an embodiment of the present application.

FIG. 10 is a schematic block diagram of a network control unit according to an embodiment of the present application. The network control unit 1000 in FIG. 10 includes a receiving module 1010 and a determining module 1020.

The receiving module 1010 receives a virtual machine association message, where the virtual machine association message includes an identifier of a first virtual machine and an identifier of a first virtual built-in network element, where a state of the first virtual machine changes and the first virtual built-in network element detects that the state of the first virtual machine changes. The determining module 1020 determines first information according to the identifier of the first virtual machine, where the first information includes at least one of the following information: a first forwarding entry, a location information mapping entry of the first virtual machine, and a first network policy.

In the embodiment of the present application, a network control unit determines first information according to an identifier of a first virtual machine, where a state of the first virtual machine changes and the identifier of the first virtual machine is included in a virtual machine association message, without the need of manual determining, thereby network configuration efficiency and network performance are improved.

Optionally, as an embodiment, when the first information includes the first forwarding entry, the determining module 1020 may determine an address of the first virtual machine according to the identifier of the first virtual machine; determine, according to the identifier of the first virtual built-in network element, an identifier of a first network element, and a network topology of a network including the first virtual built-in network element and the first network element, a first outbound port that is on the first network element and leads to the first virtual built-in network element; and generate the first forwarding entry for the first network element according to the address of the first virtual machine and the first outbound port, where a destination address of the first forwarding entry includes the address of the first virtual machine, and an outbound port of the first forwarding entry includes the first outbound port, where the address of the first virtual machine includes one or more of: an IP address and a MAC address.

Optionally, as another embodiment, when the identifier of the first virtual machine is the address of the first virtual machine, the determining module 1020 may determine the identifier of the first virtual machine as the address of the first virtual machine; or, the determining module 1020 may search for a correspondence between the identifier of the first virtual machine and the address of the first virtual machine according to the identifier of the first virtual machine, and determine the address of the first virtual machine.

Optionally, as another embodiment, the first network element is a network element on a path between a second virtual machine and the first virtual machine; or, the first network element is a network element on a path between an NVE node, the number of hops from which to the first virtual built-in network element is the smallest, and the first virtual machine; or, the first network element is an NVE node, the number of hops from which to the first virtual built-in network element is the smallest; or, the first network element is any NVE node in a virtual network to which the first virtual machine belongs; or, the first network element is any network element in a network.

Optionally, as another embodiment, when the first information includes the location information mapping entry of the first virtual machine, the determining module 1020 may determine, according to a network topology of a network including the first virtual built-in network element and at least one NVE node, and the identifier of the first virtual built-in network element, the NVE node, the number of hops from which to the first virtual built-in network element is the smallest; determine an identifier of a first virtual network including the first virtual machine and the first virtual built-in network element; and generate the location information mapping entry of the first virtual machine, where the location information mapping entry of the first virtual machine includes the identifier of the first virtual machine, an identifier of the NVE node, the number of hops from which to the first virtual built-in network element is the smallest, and the identifier of the first virtual network.

Optionally, as another embodiment, when the virtual machine association message carries the identifier of the first virtual network, the determining module 1020 may determine the identifier of the first virtual network according to the virtual machine association message; or, the determining module 1020 may determine, according to the identifier of the first virtual machine, a first policy corresponding to the identifier of the first virtual machine, and determine the identifier of the first virtual network according to the first policy, where the first policy includes the identifier of the first virtual network.

Optionally, as another embodiment, when the first information includes the first network policy, the determining module 1020 may search a correspondence table and a network policy table according to the identifier of the first virtual machine, and determine a network policy corresponding to the first virtual machine, where the correspondence table is used to indicate a correspondence between an identifier of a virtual machine and an identifier of a network policy, and the network policy table includes at least one group of network policies and an identifier of each group of network policies; and determine the first network policy, where the first network policy includes the network policy corresponding to the first virtual machine.

Optionally, as another embodiment, the network control unit 1000 may further include a sending module 1030. The sending module 1030 may send the first network policy to a network service device, where the network service device is configured to process services, where the services are at the fourth layer to the seventh layer of the OSI model and are in an area in which the first virtual built-in network element is located, and the network service device is determined according to the identifier of the first virtual built-in network element and a network topology of a network including the first virtual built-in network element.

Optionally, as another embodiment, the first virtual machine whose state changes includes a created virtual machine, a deleted virtual machine, a virtual machine migrating to the first virtual built-in network element, or a virtual machine whose attribute changes.

Optionally, as another embodiment, the virtual machine association message may further include a state change type of the first virtual machine. For example, the state change type may include change types such as creation, deletion, migration, attribute changing.

Optionally, as another embodiment, the first virtual built-in network element may be a network access device of the first virtual machine.

Optionally, as another embodiment, the receiving module 1010 may receive the virtual machine association message from the first virtual built-in network element.

Optionally, as another embodiment, the receiving module 1010 may receive the virtual machine association message from an access switch, where the virtual machine association message is received by the access switch from the first virtual built-in network element.

The network control unit 1000 in the embodiment may further perform an operation performed by the network control unit in the embodiment corresponding to each accompanying drawing of FIG. 1 to FIG. 9b.

Figure 11:
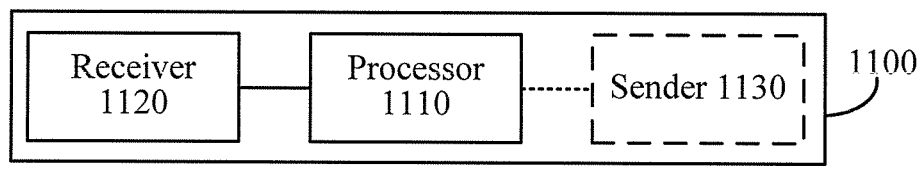
FIG. 11 is a schematic block diagram of a network control unit according to an embodiment of the present application.

FIG. 11 is a schematic block diagram of a network control unit according to an embodiment of the present application. The network control unit 1100 includes a receiver 1110 and a processor 1120.

The receiver 1110 receives a virtual machine association message, where the virtual machine association message includes an identifier of a first virtual machine and an identifier of a first virtual built-in network element, where a state of the first virtual machine changes and the first virtual built-in network element detects that the state of the first virtual machine changes. The processor 1120 determines first information according to the identifier of the first virtual machine, where the first information includes at least one of the following information: a first forwarding entry, a location information mapping entry of the first virtual machine, and a first network policy.

In the embodiment of the present application, a network control unit determines first information according to an identifier of a first virtual machine, where a state of the first virtual machine changes and the identifier of the first virtual machine is included in a virtual machine association message, without the need of manual determining, thereby network configuration efficiency and network performance are improved.

Optionally, as an embodiment, when the first information includes the first forwarding entry, the processor 1120 may determine an address of the first virtual machine according to the identifier of the first virtual machine; determine, according to the identifier of the first virtual built-in network element, an identifier of a first network element, and a network topology of a network including the first virtual built-in network element and the first network element, a first outbound port that is on the first network element and leads to the first virtual built-in network element; and generate the first forwarding entry for the first network element according to the address of the first virtual machine and the first outbound port, where a destination address of the first forwarding entry includes the address of the first virtual machine, and an outbound port of the first forwarding entry includes the first outbound port, where the address of the first virtual machine includes one or more of: an IP address and a MAC address.

Optionally, as another embodiment, when the identifier of the first virtual machine is the address of the first virtual machine, the processor 1120 may determine the identifier of the first virtual machine as the address of the first virtual machine; or, the processor 1120 may search for a correspondence between the identifier of the first virtual machine and the address of the first virtual machine according to the identifier of the first virtual machine, and determine the address of the first virtual machine.

Optionally, as another embodiment, the first network element is a network element on a path between a second virtual machine and the first virtual machine; or, the first network element is a network element on a path between an NVE node, the number of hops from which to the first virtual built-in network element is the smallest, and the first virtual machine; or, the first network element is an NVE node, the number of hops from which to the first virtual built-in network element is the smallest; or, the first network element is any NVE node in a virtual network to which the first virtual machine belongs; or, the first network element is any network element in a network.

Optionally, as another embodiment, when the first information includes the location information mapping entry of the first virtual machine, the processor 1120 may determine, according to a network topology of a network including the first virtual built-in network element and at least one NVE node, and the identifier of the first virtual built-in network element, the NVE node, the number of hops from which to the first virtual built-in network element is the smallest; determine an identifier of a first virtual network including the first virtual machine and the first virtual built-in network element; and generate the location information mapping entry of the first virtual machine, where the location information mapping entry of the first virtual machine includes the identifier of the first virtual machine, an identifier of the NVE node, the number of hops from which to the first virtual built-in network element is the smallest, and the identifier of the first virtual network.

Optionally, as another embodiment, when the virtual machine association message carries the identifier of the first virtual network, the processor 1120 may determine the identifier of the first virtual network according to the virtual machine association message; or, the processor 1120 may determine, according to the identifier of the first virtual machine, a first policy corresponding to the identifier of the first virtual machine, and determine the identifier of the first virtual network according to the first policy, where the first policy includes the identifier of the first virtual network.

Optionally, as another embodiment, when the first information includes the first network policy, the processor 1120 may search a correspondence table and a network policy table according to the identifier of the first virtual machine, and determine a network policy corresponding to the first virtual machine, where the correspondence table is used to indicate a correspondence between an identifier of a virtual machine and an identifier of a network policy, and the network policy table includes at least one group of network policies and an identifier of each group of network policies; and determine the first network policy, where the first network policy includes the network policy corresponding to the first virtual machine.

Optionally, as another embodiment, the network control unit 1000 may further include a sender 1130. The sender 1130 may send the first network policy to a network service device, where the network service device is configured to process services, where the services are at the fourth layer to the seventh layer of the OSI model and are in an area in which the first virtual built-in network element is located, and the network service device is determined according to the identifier of the first virtual built-in network element and a network topology of a network including the first virtual built-in network element.

Optionally, as another embodiment, the first virtual machine whose state changes includes a created virtual machine, a deleted virtual machine, a virtual machine migrating to the first virtual built-in network element, or a virtual machine whose attribute changes.

Optionally, as another embodiment, the first virtual built-in network element may be a network access device of the first virtual machine.

Optionally, as another embodiment, the receiver 1110 may receive the virtual machine association message from the first virtual built-in network element.

Optionally, as another embodiment, the receiver 1110 may receive the virtual machine association message from an access switch, where the virtual machine association message is received by the access switch from the first virtual built-in network element.

The network control unit 1100 in the embodiment may further perform an operation performed by the network control unit in the embodiment corresponding to each accompanying drawing of FIG. 1 to FIG. 9*b*.

Figure 12:
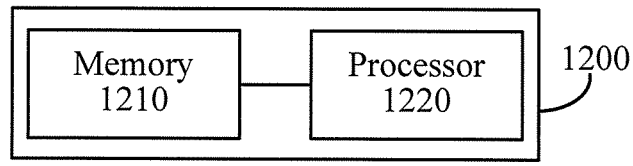
FIG. 12 is a schematic block diagram of a network control unit according to an embodiment of the present application.

FIG. 12 is a schematic block diagram of a network control unit according to an embodiment of the present application. The network control unit 1200 includes a memory 1210 and a processor 1220.

The memory 1210 may include a random memory, a flash memory, a read-only memory, a programmable read-only memory, a non-volatile memory, a register, or the like. The processor 1220 may be a central processing unit (CPU).

The memory 1210 is configured to store an executable instruction. The processor 1220 may execute the executable instruction stored in the memory 1210, and is configured to: receive a virtual machine association message, where the virtual machine association message includes an identifier of a first virtual machine and an identifier of a first virtual built-in network element, where a state of the first virtual machine changes and the first virtual built-in network element detects that the state of the first virtual machine changes; and determine first information according to the identifier of the first virtual machine, where the first information includes at least one of the following information: a first forwarding entry, a location information mapping entry of the first virtual machine, and a first network policy.

In the embodiment of the present application, a network control unit determines first information according to an identifier of a first virtual machine, where a state of the first virtual machine changes and the identifier of the first virtual machine is included in a virtual machine association message, without the need of manual determining, thereby network configuration efficiency and network performance are improved.

Optionally, as an embodiment, the processor 1220 may further execute the executable instruction stored in the memory 1210, and is configured to: when the first information includes the first forwarding entry, determine an address of the first virtual machine according to the identifier of the first virtual machine; determine, according to the identifier of the first virtual built-in network element, an identifier of a first network element, and a network topology of a network including the first virtual built-in network element and the first network element, a first outbound port that is on the first network element and leads to the first virtual built-in network element; and generate the first forwarding entry for the first network element according to the address of the first virtual machine and the first outbound port, where a destination address of the first forwarding entry includes the address of the first virtual machine, and an outbound port of the first forwarding entry includes the first outbound port, where the address of the first virtual machine includes one or more of: an IP address and a MAC address.

Optionally, as another embodiment, the processor 1220 may further execute the executable instruction stored in the memory 1210, and is configured to: when the identifier of the first virtual machine is the address of the first virtual machine, determine the identifier of the first virtual machine as the address of the first virtual machine; or, search for a correspondence between the identifier of the first virtual machine and the address of the first virtual machine according to the identifier of the first virtual machine, and determine the address of the first virtual machine.

Optionally, as another embodiment, the first network element is a network element on a path between a second virtual machine and the first virtual machine; or, the first network element is a network element on a path between an NVE node, the number of hops from which to the first virtual built-in network element is the smallest, and the first virtual machine; or, the first network element is an NVE node, the number of hops from which to the first virtual built-in network element is the smallest; or, the first network element is any NVE node in a virtual network to which the first virtual machine belongs; or, the first network element is any network element in a network.

Optionally, as another embodiment, the processor 1220 may further execute the executable instruction stored in the memory 1210, and is configured to: when the first information includes the location information mapping entry of the first virtual machine, determine, according to a network topology of a network including the first virtual built-in network element and at least one NVE node, and the identifier of the first virtual built-in network element, the NVE node, the number of hops from which to the first virtual built-in network element is the smallest; determine an identifier of a first virtual network including the first virtual machine and the first virtual built-in network element; and generate the location information mapping entry of the first virtual machine, where the location information mapping entry of the first virtual machine includes the identifier of the first virtual machine, an identifier of the NVE node, the number of hops from which to the first virtual built-in network element is the smallest, and the identifier of the first virtual network.

Optionally, as another embodiment, the processor 1220 may further execute the executable instruction stored in the memory 1210, and is configured to: when the virtual machine association message carries the identifier of the first virtual network, determine the identifier of the first virtual network according to the virtual machine association message; or, determine, according to the identifier of the first virtual machine, a first policy corresponding to the identifier of the first virtual machine, and determine the identifier of the first virtual network according to the first policy, where the first policy includes the identifier of the first virtual network.

Optionally, as another embodiment, the processor 1220 may further execute the executable instruction stored in the memory 1210, and is configured to: when the first information includes the first network policy, search a correspondence table and a network policy table according to the identifier of the first virtual machine, and determine a network policy corresponding to the first virtual machine, where the correspondence table is used to indicate a correspondence between an identifier of a virtual machine and an identifier of a network policy, and the network policy table includes at least one group of network policies and an identifier of each group of network policies; and determine the first network policy, where the first network policy includes the network policy corresponding to the first virtual machine.

Optionally, as another embodiment, the processor 1220 may further execute the executable instruction stored in the memory 1210, and is configured to send the first network policy to a network service device, where the network service device is configured to process services, where the services are at the fourth layer to the seventh layer of the OSI model and are in an area in which the first virtual built-in network element is located, and the network service device is determined according to the identifier of the first virtual built-in network element and a network topology of a network including the first virtual built-in network element.

Optionally, as another embodiment, the first virtual machine whose state changes includes a created virtual machine, a deleted virtual machine, a virtual machine migrating to the first virtual built-in network element, or a virtual machine whose attribute changes.

Optionally, as another embodiment, the first virtual built-in network element may be a network access device of the first virtual machine.

Optionally, as another embodiment, the processor 1220 may further execute the executable instruction stored in the memory 1210, and is configured to receive the virtual machine association message from the first virtual built-in network element.

Optionally, as another embodiment, the processor 1220 may further execute the executable instruction stored in the memory 1210, and is configured to receive the virtual machine association message from an access switch, where the virtual machine association message is received by the access switch from the first virtual built-in network element.

The network control unit 1200 in the embodiment may further perform an operation performed by the network control unit in the embodiment corresponding to each accompanying drawing of FIG. 1 to FIG. 9*b*.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, which is not described in detail herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method for generating configuration information, the method comprising:
   receiving, by a network control unit, a virtual machine association message comprising an identifier of a first virtual machine and an identifier of a first virtual built-in network element, where a state of the first virtual machine changes and the first virtual built-in network element detects that the state of the first virtual machine changes; and
   determining, by the network control unit, first information according to the identifier of the first virtual machine, wherein the first information comprises at least one of the following information: a first forwarding entry, a location information mapping entry of the first virtual machine, and a first network policy;
   when the first information comprises the location information mapping entry of the first virtual machine, determining, by the network control unit, first information according to the identifier of the first virtual machine comprises:
      determining, according to a network topology of a network comprising the first virtual built-in network element and at least one network virtualization environment (NVE) node, and the identifier of the first virtual built-in network element, the NVE node, the number of hops from which to the first virtual built-in network element is the smallest,
      determining an identifier of a first virtual network comprising the first virtual machine and the first virtual built-in network element, and
      generating the location information mapping entry of the first virtual machine, wherein the location information mapping entry of the first virtual machine comprises the identifier of the first virtual machine, an identifier of the NVE node, the number of hops from which to the first virtual built-in network element is the smallest, and the identifier of the first virtual network.

2. The method according to claim 1, wherein when the first information comprises the first forwarding entry, determining, by the network control unit, first information according to the identifier of the first virtual machine comprises:
   determining an address of the first virtual machine according to the identifier of the first virtual machine;
   determining, according to the identifier of the first virtual built-in network element, an identifier of a first network element, and a network topology of a network comprising the first virtual built-in network element and the first network element, a first outbound port that is on the first network element and leads to the first virtual built-in network element; and
   generating the first forwarding entry for the first network element according to the address of the first virtual machine and the first outbound port, wherein a destination address of the first forwarding entry comprises the address of the first virtual machine, and an outbound port of the first forwarding entry comprises the first outbound port, wherein the address of the first virtual machine includes one or more of an Internet Protocol (IP) address and a Media Access Control (MAC) address.

3. The method according to claim 2, wherein determining an address of the first virtual machine according to the identifier of the first virtual machine comprises one of:
   when the identifier of the first virtual machine is the address of the first virtual machine, determining the identifier of the first virtual machine as the address of the first virtual machine; and
   searching for a correspondence between the identifier of the first virtual machine and the address of the first virtual machine according to the identifier of the first virtual machine, and determining the address of the first virtual machine.

4. The method according to claim 2, wherein the first network element is one of:
   a network element on a path between a second virtual machine and the first virtual machine;
   a network element on a path between a network virtualization environment (NVE) node, the number of hops from which to the first virtual built-in network element is the smallest, and the first virtual machine;
   an NVE node, the number of hops from which to the first virtual built-in network element is the smallest;
   any NVE node in a virtual network to which the first virtual machine belongs; and
   any network element in a network.

5. The method according to claim 1, wherein determining an identifier of a first virtual network comprising the first virtual machine and the first virtual built-in network element comprises one of:
   when the virtual machine association message carries the identifier of the first virtual network, determining the identifier of the first virtual network according to the virtual machine association message; and determining, according to the identifier of the first virtual machine, a first policy corresponding to the identifier of the first virtual machine, and determining the identifier of the first virtual network according to the first policy, wherein the first policy comprises the identifier of the first virtual network.

6. The method according to claim 1, wherein when the first information comprises the first network policy, determining, by the network control unit, first information according to the identifier of the first virtual machine comprises:

searching a correspondence table and a network policy table according to the identifier of the first virtual machine, and determining a network policy corresponding to the first virtual machine, wherein the correspondence table is used to indicate a correspondence between an identifier of a virtual machine and an identifier of a network policy, and the network policy table comprises at least one group of network policies and an identifier of each group of network policies; and determining the first network policy, wherein the first network policy comprises the network policy corresponding to the first virtual machine.

7. The method according to claim 6, further comprising:
sending the first network policy to a network service device configured to process services, where the services are at a fourth layer to a seventh layer of the Open System Interconnection (OSI) model and are in an area in which the first virtual built-in network element is located, and the network service device is determined according to the identifier of the first virtual built-in network element and a network topology of a network comprising the first virtual built-in network element.

8. The method according to claim 1, wherein the first virtual machine whose state changes is one of: a created virtual machine, a deleted virtual machine, a virtual machine migrating to the first virtual built-in network element, and a virtual machine whose attribute changes.

9. The method according to claim 1, wherein the first virtual built-in network element is a network access device of the first virtual machine.

10. The method according to claim 1, wherein receiving, by a network control unit, a virtual machine association message comprises one of:

receiving, by the network control unit, the virtual machine association message from the first virtual built-in network element; and receiving, by the network control unit, the virtual machine association message from an access switch, wherein the virtual machine association message is received by the access switch from the first virtual built-in network element.

11. A non-transitory computer-readable storage medium comprising instructions which, when executed by a computer, cause the computer to:

receive a virtual machine association message comprising an identifier of a first virtual machine and an identifier of a first virtual built-in network element, where a state of the first virtual machine changes and the first virtual built-in network element detects that the state of the first virtual machine changes;

determine first information according to the identifier of the first virtual machine, wherein the first information comprises at least one of the following information: a first forwarding entry, a location information mapping entry of the first virtual machine, and a first network policy;

when the first information comprises the location information mapping entry of the first virtual machine:

determine, according to a network topology of a network comprising the first virtual built-in network element and at least one network virtualization environment (NVE) node, and the identifier of the first virtual built-in network element, the NVE node, the number of hops from which to the first virtual built-in network element is the smallest, determine an identifier of a first virtual network comprising the first virtual machine and the first virtual built-in network element, and generate the location information mapping entry of the first virtual machine, wherein the location information mapping entry of the first virtual machine comprises the identifier of the first virtual machine, an identifier of the NVE node, the number of hops from which to the first virtual built-in network element is the smallest, and the identifier of the first virtual network.

12. The non-transitory computer-readable storage medium according to claim 11, wherein when the first information comprises the first forwarding entry, execution of the instructions further causes the computer to:

determine an address of the first virtual machine according to the identifier of the first virtual machine;

determine, according to the identifier of the first virtual built-in network element, an identifier of a first network element, and a network topology of a network comprising the first virtual built-in network element and the first network element, a first outbound port, where the first outbound port is on the first network element and leads to the first virtual built-in network element; and generate the first forwarding entry for the first network element according to the address of the first virtual machine and the first outbound port, wherein a destination address of the first forwarding entry comprises the address of the first virtual machine, and an outbound port of the first forwarding entry comprises the first outbound port, wherein the address of the first virtual machine includes one or more of: an Internet Protocol (IP) address and a Media Access Control (MAC) address.

13. The non-transitory computer-readable storage medium according to claim 12, wherein execution of the instructions further causes the computer to:

when the identifier of the first virtual machine is the address of the first virtual machine, determine the identifier of the first virtual machine as the address of the first virtual machine; or search for a correspondence between the identifier of the first virtual machine and the address of the first virtual machine according to the identifier of the first virtual machine, and determine the address of the first virtual machine.

14. The non-transitory computer-readable storage medium according to claim 12, wherein the first network element is one of:

a network element on a path between a second virtual machine and the first virtual machine;

a network element on a path between a network virtualization environment (NVE) node, the number of hops from which to the first virtual built-in network element is the smallest, and the first virtual machine;

an NVE node, the number of hops from which to the first virtual built-in network element is the smallest;

any NVE node in a virtual network to which the first virtual machine belongs; and any network element in a network.

15. A method comprising:

receiving, by a network control unit, a virtual machine (VM) association message, where the VM association message comprises an identifier of a first VM and an identifier of a first virtual built-in network element (NE), where the VM association message is generated by the first virtual built-in NE when the first virtual built-in NE determines that a state of the first VM changes, where the first virtual built-in NE communicates with the network control unit, the first virtual built-in NE communicates with the first VM, and the first virtual built-in NE is capable of perceiving the change of the state of the first VM;

determining, by the network control unit, first information according to the identifier of the first VM, wherein the first information comprises at least one of the following information: a first forwarding entry, a location information mapping entry of the first VM, and a first network policy; and wherein when the first information comprises the location information mapping entry of the first VM, determining, by the network control unit, the first information according to the identifier of the first VM comprises:

determining, according to a network topology of a network and the identifier of the first virtual built-in NE, a first network virtualization environment (NVE) node, where the network comprises the first virtual built-in NE and at least one NVE node, and the number of hops from the first NVE node of the at least one NVE node to the first virtual built-in NE is the smallest, determining an identifier of a first virtual network comprising the first VM and the first virtual built-in NE, and generating the location information mapping entry of the first VM, where the location information mapping entry of the first VM comprises the identifier of the first VM, an identifier of the first NVE node and the identifier of the first virtual network.

16. The method according to claim 15, where determining the identifier of the first virtual network comprising the first VM and the first virtual built-in NE comprises one of:

when the VM association message carries the identifier of the first virtual network, determining the identifier of the first virtual network according to the virtual machine association message; and determining, according to the identifier of the first virtual machine, a first policy corresponding to the identifier of the first virtual machine, and determining the identifier of the first virtual network according to the first policy, wherein the first policy comprises the identifier of the first virtual network.

* * * * *